US012033519B2

(12) United States Patent
Larson et al.

(10) Patent No.: US 12,033,519 B2
(45) Date of Patent: Jul. 9, 2024

(54) FLIGHT RISK ANALYSIS SYSTEM

(71) Applicant: ARCTOS Technology Solutions, LLC, Beavercreek, OH (US)

(72) Inventors: Erik William Feldmeth Larson, Torrance, CA (US); Tyler Gras, Torrance, CA (US); Steven Carbon, Torrance, CA (US)

(73) Assignee: ARCTOS Technology Solutions, LLC, Beavercreek, OH (US)

( * ) Notice: Subject to any disclaimer, the term of this patent is extended or adjusted under 35 U.S.C. 154(b) by 389 days.

(21) Appl. No.: 17/224,445

(22) Filed: Apr. 7, 2021

(65) Prior Publication Data

US 2022/0051569 A1 Feb. 17, 2022

Related U.S. Application Data

(60) Provisional application No. 63/006,647, filed on Apr. 7, 2020.

(51) Int. Cl.
*G08G 5/00* (2006.01)
*B64G 1/24* (2006.01)

(52) U.S. Cl.
CPC ............. *G08G 5/003* (2013.01); *B64G 1/242* (2013.01)

(58) Field of Classification Search
CPC .... G08G 5/003; G08G 5/0086; G08G 5/0034; G08G 5/006; G08G 5/0091; B64G 1/242
See application file for complete search history.

(56) References Cited

U.S. PATENT DOCUMENTS

| | | | | |
|---|---|---|---|---|
| 2017/0178037 | A1* | 6/2017 | Kaye | G06Q 10/02 |
| 2018/0253978 | A1* | 9/2018 | Tabuchi | G05D 1/0011 |
| 2020/0286391 | A1* | 9/2020 | Beaurepaire | G08G 5/0091 |
| 2021/0225179 | A1* | 7/2021 | Cleaver | G01C 23/00 |

FOREIGN PATENT DOCUMENTS

| | | |
|---|---|---|
| CN | 109543242 A | 3/2019 |

OTHER PUBLICATIONS

International Search Report and Written Opinion dated Sep. 30, 2021, directed to International Application No. PCT/US2021/026123; 16 pages.

(Continued)

*Primary Examiner* — Shon G Foley
(74) *Attorney, Agent, or Firm* — Morrison & Foerster LLP

(57) ABSTRACT

Described are techniques for determining measures of risk through a medium fidelity, fast running flight risk analysis system, for evaluating risk of a launch or reentry. The method may include receiving trajectory information associated with a planned flight, wherein the trajectory information comprises a series of trajectory vectors, each trajectory vector comprising time information, position information and velocity information. Identification of consequences of interest, and an extent of a region of interest for potential hazard areas may also be received. The method may include determining an upper bound of expected consequence for each population center based on a number of people in each population center subject to different consequences, determining one or more collective risk metrics for each population center, and a collective risk metric for all population centers.

23 Claims, 26 Drawing Sheets

(56) References Cited

OTHER PUBLICATIONS

Lee, M. et al. (Dec. 2015). "Analysis of population damage by space debris upon collision with Earth based on the reverse geocoding method," Aerospace Science and Technology 50: 139-148.
Primatesta, S. et al. (May 2019). "Ground Risk Map for Unmanned Aircraft in Urban Environments," Journal of Intelligent & Robotic Systems 97(3-4): 489-509.

* cited by examiner

FLIGHT RISK ANALYSIS SYSTEM

CROSS-REFERENCE TO RELATED APPLICATIONS

This application claims priority to and the benefit of U.S. Provisional Application No. 63/006,647, filed Apr. 7, 2020, the entire contents of which are incorporated herein by reference.

STATEMENT REGARDING FEDERALLY SPONSORED RESEARCH OR DEVELOPMENT

This invention was made with government support under Contract No. 693KA9-18-D-0001 awarded by the Federal Aviation Administration Office of Commercial Space Transportation. The government has certain rights in this invention.

FIELD

This invention relates generally to flight risk assessment. More particularly, it relates to determining measures of risk associated with a launch or reentry.

BACKGROUND

Prior to approving a mission, flight operators typically need to understand the risk associated with the mission. In particular, flight operators typically need to understand the risk to persons and objects of value in the event of a vehicle failure during a vehicle launch or reentry.

Flight risk assessment uses probabilistic modeling to quantify risk based on the probability of a vehicle failure during a launch or reentry. Metrics may be generated that characterize risk based on various sources of uncertainty that affect debris propagation during a vehicle failure. Some risk metrics must be reported to the government prior to a mission to comply with regulations and reporting requirements.

Risk assessment tools exist. However, existing tools require a substantial amount of input data characterizing the mission plan, vehicle, and possible failures. These tools also require a large number of complex simulations that require substantial time and computing resources.

SUMMARY

As discussed above, there is a need for a flight risk assessment system that provides conservative measures of risk that while reducing the complexity, time, and mission-specific input requirements necessary to analyze risk. This need may be addressed by the systems and methods described herein for configuring and using a flight risk assessment system for determining the risk associated with a mission. The systems and methods disclosed herein may provide a medium-fidelity, fast-running flight risk analysis system.

The systems and methods described herein allow for the determination of conservative flight risk assessment measures, such as expected casualty value, based on a simplified model that requires less input information characterizing a vehicle and/or debris than existing tools and requires less time and computing resources to run.

In one or more embodiments, based on a limited set of input data, the system may determine risk metrics associated with a vehicle failure, such as expected casualty value, probability of casualty, or probability of other adverse consequences. Based on a simplified model, the system may generate consequence probability distributions corresponding to one or more types of vehicle failure at each stage of a flight. For a plurality of times in the planned flight trajectory, the system may determine consequence probability distributions for a range of debris ballistic coefficients to determine the maximum consequence of a vehicle failure, without requiring a detailed model of the vehicle. For each probability distribution, the system may determine expected risk metric values based on the population density of a geographic area corresponding to the impact probability distribution. The largest risk metric at any given location over all credible consequence probability distributions during any given failure interval is selected for that location. The sum of all the maximums over all locations may be selected as the total expected risk metric value of the mission.

The system reduces computational complexity and mission-specific data requirements by making worst-case assumptions and about some sources of uncertainty. To determine risk metric values for adverse consequences including, for example casualties, fatalities or damage, the system may determine a probability distribution of consequence area density as a function of ballistic coefficient.

Based on the risk metric values generated by the system, a user may proceed with a mission if the risks are below predetermined threshold levels.

In some embodiments, a method for evaluating risk of a launch or reentry, includes receiving trajectory information associated with a planned flight, wherein the trajectory information comprises a series of trajectory vectors, each trajectory vector comprising time information, position information and velocity information; receiving identification of consequences of interest, and extent of a region of interest for potential hazard areas; determining, for each of a plurality of ballistic coefficients, impact probability distributions for each trajectory vector, across a credible range of breakup-induced velocity, trajectory uncertainty, wind effects, and lift uncertainty for a set of one or more vehicle failure modes, wherein each impact probability distribution corresponds to the probability of debris landing in one or more locations; determining, for each impact probability distribution, the probabilities of consequence for different adverse consequences, using enveloping curves of consequence area as a function of ballistic coefficient; determining populations, based on external data sources, and a grid resolution, within the region of interest; determining a maximum probability of consequence for each identified consequence of interest, for each failure mode, and for each population center and grid cell, based on a maximum of the probability over uncertainties; determining an upper bound of a probability of consequence for each grid cell and population center by summing the probability of consequence over all failure modes, weighted by the probability of the failure mode; and determining an upper bound of expected consequence for each population center based on a number of people in each population center subject to different consequences, determining one or more collective risk metrics for each population center, and a collective risk metric for all population centers.

In some embodiments, the method further includes, in accordance with a determination that the collective risk metric for all population centers is less than a predefined level, approving the flight. In some embodiments, the method further includes, in accordance with a determination that the collective risk metric for all population centers is greater than a predefined level, canceling the flight. In some embodiments, the method further includes, displaying to a user the collective risk metric for all population centers. In some embodiments, the method further includes, wherein at least one of the one or more vehicle failure modes is selected from the group comprising on-trajectory structural failure, on-trajectory explosion, guidance system failure, control system failure, or loss of thrust.

Embodiments of an electronic system, may include one or more processors; one or more memories; and one or more programs, wherein the one or more programs are stored in the one or more memories and configured to be executed by the one or more processors, the one or more programs including instructions for: receiving trajectory information associated with a planned flight, wherein the trajectory information comprises a series of trajectory vectors, each trajectory vector comprising time information, position information and velocity information; receiving identification of consequences of interest, and extent of a region of interest for potential hazard areas; determining, for each of a plurality of ballistic coefficients, impact probability distributions for each trajectory vector, across a credible range of breakup-induced velocity, trajectory uncertainty, wind effects, and lift uncertainty for a set of one or more vehicle failure modes, wherein each impact probability distribution corresponds to the probability of debris landing in one or more locations; determining, for each impact probability distribution, the probabilities of consequence for different adverse consequences, using enveloping curves of consequence area as a function of ballistic coefficient; determining populations, based on external data sources, and a grid resolution, within the region of interest; determining a maximum probability of consequence for each identified consequence of interest, for each failure mode, and for each population center and grid cell, based on a maximum of the probability over uncertainties, determining an upper bound of a probability of consequence for each grid cell and population center by summing the probability of consequence over all failure modes, weighted by the probability of the failure mode; and determining an upper bound of expected consequence for each population center based on a number of people in each population center subject to different consequences, determining one or more collective risk metrics for each population center, and a collective risk metric for all population centers.

Embodiments of a non-transitory computer readable storage medium storing one or more programs, the one or more programs comprising instructions, which when executed by an electronic system, cause the device to: receive trajectory information associated with a planned flight, wherein the trajectory information comprises a series of trajectory vectors, each trajectory vector comprising time information, position information and velocity information; receive identification of consequences of interest, and extent of a region of interest for potential hazard areas; determine, for each of a plurality of ballistic coefficients, impact probability distributions for each trajectory vector, across a credible range of breakup-induced velocity, trajectory uncertainty, wind effects, and lift uncertainty for a set of one or more vehicle failure modes, wherein each impact probability distribution corresponds to the probability of debris landing in one or more locations; determine, for each impact probability distribution, the probabilities of consequence for different adverse consequences, using enveloping curves of consequence area as a function of ballistic coefficient; determine populations, based on external data sources, and a grid resolution, within the region of interest; determine a maximum probability of consequence for each identified consequence of interest, for each failure mode, and for each population center and grid cell, based on a maximum of the probability over uncertainties, determine an upper bound of a probability of consequence for each grid cell and population center by summing the probability of consequence over all failure modes, weighted by the probability of the failure mode; and determine an upper bound of expected consequence for each population center based on a number of people in each population center subject to different consequences, determining one or more collective risk metrics for each population center, and a collective risk metric for all population centers.

DETAILED DESCRIPTION

Described within are systems and methods for determining risk associated with a launch or reentry. The systems and methods described herein allow for the determination of conservative flight risk assessment measures, such as expected casualty value, based on a simplified model that requires less input information characterizing a vehicle and/or debris than existing tools and requires less time and computing resources to run.

In some embodiments, the system may receive one or more inputs from a user and/or one or more databases corresponding to flight trajectory information, weather information, vehicle information, and other information. Based on the inputs, the system may determine consequence probability distributions for geographic areas near the flight path and expected casualty and/or other risk values based on the probability distributions and population.

The system may receive flight trajectory information comprising a plurality of trajectory vectors. Each trajectory vector may correspond to a time during a launch or reentry, and may include a position and velocity vector. For each trajectory vector, the system may determine an impact probability distribution for a range of debris ballistic coefficients based on one or more vehicle failure modes. The impact probability distributions may be determined based on multiple sources of uncertainty affecting debris propagation, such as trajectory uncertainty, debris uncertainty, lift uncertainty, or other sources.

Each debris casualty area value may be determined as a conservative value for all possible debris that accounts for each ballistic coefficient. In this way, the system does not require individual pieces of debris to be modeled.

For each impact probability distribution, the system may use the debris consequence area to determine a probability of consequence value associated with each impact probability distribution. In some embodiments, the highest consequence value among all probability distributions may be selected as the consequence probability value for each location. Together with the data representing the people, structures, or objects exposed at that situation, expected consequence values may then be determined.

Figure 1:
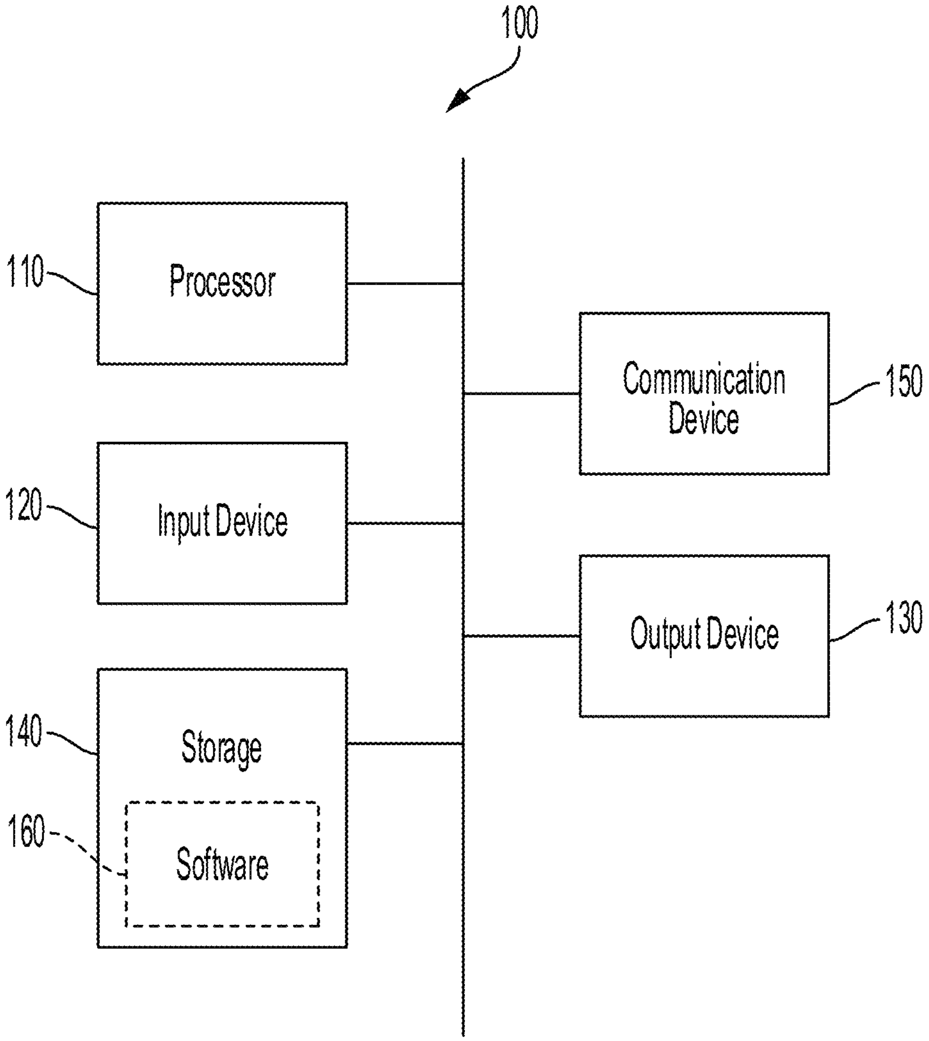
FIG. 1 shows a flight risk assessment system, according to some embodiments.

FIG. 1 illustrates an example of a flight risk assessment system 100, in accordance with one embodiment. In some embodiments, system 100 is configured to execute a method of determining risk associated with a flight, such as described with respect to method 300 of FIG. 3, below.

In some embodiments, system 100 can be any suitable type of microprocessor-based device, such as a personal computer, workstation, server, videogame console, or handheld computing device, such as a phone or tablet. The system can include, for example, one or more of processor 110, input device 120, output device 130, storage 140, and communication device 150. Input device 120 and output device 130 can generally correspond to those described above and can either be connectable or integrated with the computer.

In some embodiments, system 100 can be a computer. System 100 can be a local computer or a cloud computing platform. System 100 can include multiple computers. Computers composing system 100 may be co-located or may be located in different locations. System 100 can be a host computer connected to a network. In other embodiments, system 100 can be a client computer or a server.

Input device 120 can be any suitable device that provides input, such as a touch screen or monitor, keyboard, mouse, or voice-recognition device. Output device 130 can be any suitable device that provides output, such as a touch screen, monitor, printer, disk drive, or speaker.

Storage 140 can be any suitable device that provides storage, such as an electrical, magnetic, or optical memory, including a RAM, cache, hard drive, CD-ROM drive, tape drive, or removable storage disk.

Communication device 150 can include any suitable device capable of transmitting and receiving signals over a network, such as a network interface chip or card. The components of the computer can be connected in any suitable manner, such as via a physical bus or wirelessly.

Figure 3:
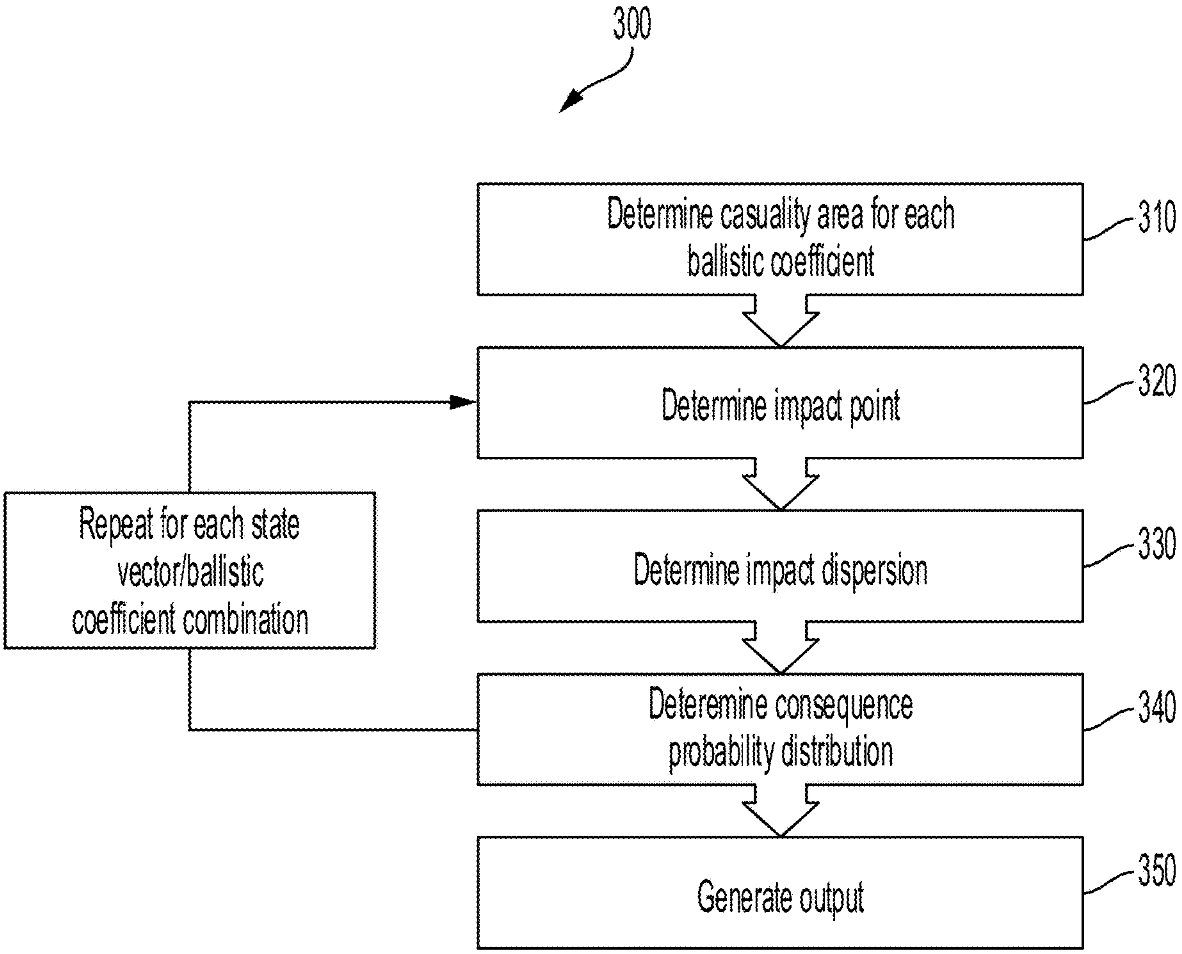
FIG. 3 shows a method for determining expected casualty values for a flight, according to some embodiments.

Storage 140 can be a non-transitory computer-readable storage medium comprising one or more programs, which, when executed by one or more processors, such as processor 110, cause the one or more processors to execute methods described herein, such as method 300 of FIG. 3.

Software 160, which can be stored in storage 140 and executed by processor 110, can include, for example, the programming that embodies the functionality of the present disclosure (e.g., as embodied in the systems, computers, servers, and/or devices as described above). In some embodiments, software 160 can be implemented and executed on a combination of servers such as application servers and database servers.

Software 160, or part thereof, can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 140, that can contain or store programming for use by or in connection with an instruction execution system, apparatus, or device.

Software 160 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include, but is not limited to, an electronic, magnetic, optical, electromagnetic, or infrared wired or wireless propagation medium.

System 100 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

System 100 can implement any operating system suitable for operating on the network. Software 160 can be written in any suitable programming language, such as C, C++, Java, or Python. In various embodiments, application software embodying the functionality of the present disclosure can be deployed in different configurations, such as in a client/ server arrangement or through a Web browser as a Web-based application or Web service, for example.

Figure 2:
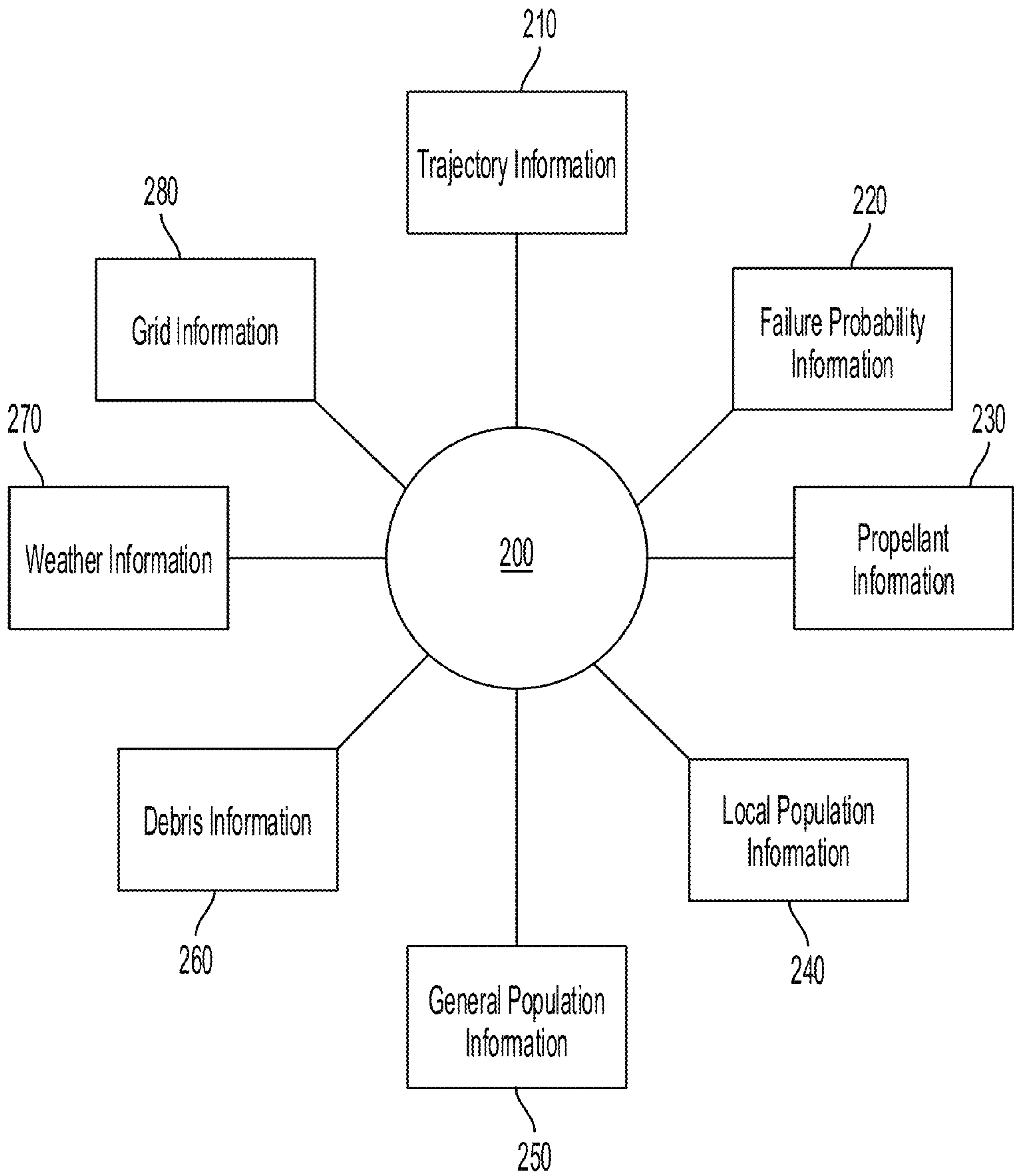
FIG. 2 shows input information for a flight risk assessment system, according to some embodiments.

FIG. 2 illustrates input data for a flight risk assessment system 200 according to some embodiments. System 200 may correspond to the flight risk assessment system 100 discussed with respect to FIG. 1, above.

Input data may be stored within system 200, and system 200 may also receive input data from a user, from external databases, or from other sources. Based on the input data, system 200 may determine one or more consequence probability distributions corresponding to one or more geographic areas. Based on the probability distributions, system 200 may also determine one or more expected consequence values associated with a launch or reentry for one or more flights.

In some embodiments, system 200 may receive one or more sets of input data from a user, such as trajectory information 210, failure probability information 220, propellant information 230, and local population information 240.

Trajectory information 210 may comprise planned trajectory information for a launch or reentry. The trajectory information may include a plurality of trajectory vectors, each trajectory vector comprising a time values and position vectors and/or velocity vectors associated with the time value. The trajectory information may be stored as an array of data, or as another type of data structure.

The position vector may comprise one or more coordinate values. The position vector may be expressed as latitude-longitude-altitude coordinates, as earth-centered or earth-fixed coordinates, as local tangent plane coordinates, or as other set of coordinate values to identify the position of the vehicle at each time during the launch or reentry. The velocity vector may also comprise one or more velocity values to express the velocity and direction of the vehicle at each time during the launch or reentry. The velocity vector may also be expressed in any three-dimensional coordinate system, with a velocity component value corresponding to each dimension in the system. For example, in a local tangent plane coordinate system, the velocity vector may be expressed as a velocity north value, velocity east value, and velocity down value.

System 200 may be configured to receive trajectory information in any format. For example, system 200 may be configured to receive trajectory information from data files based on different data file formats, coordinate systems, and/or measurement units. System 200 may be configured to convert a received trajectory data file or received trajectory information into a format suitable for analysis. For example, system 200 may be configured to perform flight risk analysis based on a first coordinate system, such as earth-centered rotational coordinates. System 200 may be configured to convert received trajectory information expressed in a different coordinate system into trajectory information expressed in the coordinate system on which system 200 is configured to operate.

Failure probability information 220 may comprise information corresponding to the probability of particular types of vehicle failure at different times during the flight. For example, failure probability information may include probabilities of an explosion, structural failure, guidance system malfunction, control system malfunction, and/or other failure. The failure probability information may include, for each type of vehicle failure, failure probabilities corresponding to different temporal stages of the launch or reentry. For example, the failure probability information may indicate a 1% probability of an explosion during stage 1, a 2% probability of an explosion during stage 2, and a 3% probability of an explosion during stage 3. Each stage may correspond to a different segment of the planned flight trajectory. In some embodiments, system 200 may be configured to accept failure probability information for only certain types of failures to simplify the expected consequence determination. The failure probability information may be stored as an array of data, or as another type of data structure.

Propellant information 230 may comprise information corresponding to the type of vehicle propellant used during a flight. In some embodiments, the propellant information may indicate that the launch or reentry will use a certain class of propellant, such as liquid, solid, or other class of propellant. In other embodiments, the propellant information may indicate that the launch or reentry will use a specific propellant, such as kerosene, natural gas, or other propellant.

Local population information 240 may comprise population information for the area near a launch or landing site. As explained below, system 200 may receive general population information 250 that comprises population information for a wide area around the launch or reentry trajectory. In some embodiments, a user may provide local population information 240 that is more accurate than general population information 250 and allows for more accurate risk assessment. For example, the local population information may provide population density values with higher resolution than the general population information. The local population information may also comprise expected population information in the area near the launch site at the time of a launch. The local population information may also distinguish between classes of persons. For example, the local population information may distinguish the general public from mission involved personnel, government personnel, or other classes of individuals. Based on these distinctions, system 200 may provide expected consequence determinations for different classes of individuals. The local population information may also comprise higher resolution population information than general population information 150, discussed below. For example, the local population information may include population information for each building within a predefined distance from a launch site.

In some embodiments, system 200 may receive additional input data from external databases, or may use information stored locally as input data.

Additional input data received by system 200 may include general population information 250, debris information 260, weather information 270, grid information 280, and/or other input data.

General population information 250 may comprise geographic population distribution information for areas near the planned vehicle trajectory. In some embodiments, the general population information may comprise a grid and a population density value associated with each cell. The population value may represent the average population density of the cell. That is, the population of the cell divided by the geographic area of each cell.

The general population information may be generated by a user or obtained from an open-source or commercial source, such as LandScan™ or Gridded Population of the World (GPW). The general population information may also be derived from census data. In some embodiments, a user may select which database of general population information is used by system 200. In other embodiments, system 200 may select a general population information database based on a default selection.

The general population information may be stored as an array of data in a database, or as another type of data structure. In some embodiments, the general population information may be stored locally by system 200. In other embodiments, the general population information may be stored separate from system 200.

Debris information 260 may include the weight of the vehicle and the weight and/or amount of propellant. In some embodiments, these values may be provided by a user. The system may determine, based on the amount of propellant, the effective consequence areas. The system may determine, based on the weight of the vehicle, the total consequence area density as a function of ballistic coefficient.

Debris information 260 may also comprise one or more databases that include a range of ballistic coefficients and one or more debris characteristic values corresponding to each ballistic coefficient.

The debris information values stored in the database may be derived from measurements and/or models of a plurality of discrete pieces of debris. For a plurality of debris pieces having a range of ballistic coefficients, debris characteristics, such as lift, breakup-induced velocity, explosive velocity, and/or other characteristics, may be obtained, either by empirical measurement or modeling. For each debris characteristic, enveloping curves as a function of ballistic coefficient may be established to represent minimum and maximum credible values. These may be derived using statistical modeling based on the measured or modeled values. In this way, the enveloping curves associated with each characteristic may be used to create consequence probability distributions for different failure types during a flight interval.

The impact dispersion at each given location can then be used to calculate the impact probability density at that location for each ballistic coefficient range for each source of variability.

The impact probability at a location may then be multiplied by the consequence area to get the probability of consequence for a single object/person, and summed across the ballistic coefficient range for the initial state vector. The maximum consequence probability density at a given location can then be determined based on all failure types and sources of variability. Variability is due to, but not limited by, the trajectory profile, the wind profile, time of breakup, and altitude of breakup. Then the probability of consequence is multiplied by the number of people/objects to get an expected consequence value.

For each debris characteristic, the database may be populated with the values on the corresponding enveloping curve for a range of ballistic coefficients. In this way, the debris information database may store values that represents the credible range of values for all debris. The database may store different values for different types of propellant. For example, for a debris characteristic, the database may store a set of values associated with a liquid propellant and a second set of values associated with a solid propellant.

By using enveloping curves, the system does not require extensive input information describing the debris pieces and characteristics of the vehicle. Instead, the system only receives information corresponding to the weight of the vehicle and the weight and type of the propellant and selects a range of values for each debris characteristic over an interval of ballistic coefficients.

Weather information 270 may comprise atmospheric and weather information for areas near the planned vehicle trajectory. The weather information may include atmospheric information, such as temperature, density, pressure, and viscosity information, and wind information. The weather information may be based on historical data, statistical models, and/or projections of future weather conditions near the time and location of the flight.

The weather information may be derived from any source, such as the Global Gridded Upper Air Statistics database (GGUAS), the Global Climate Observing System Upper-Air Network database (GUAN), NOAA/ESRL Radiosonde Database, or other source of weather information. In some embodiments, the weather information may be selected from one or more databases comprising weather information for a particular launch or landing site. For example, weather information may be received from a database comprising weather information for Cape Canaveral, Fla.; Boca Chica, Tex.; or other location. In some embodiments, a user may select which database of weather information is used by system 200. In other embodiments, system 200 may select a weather information database based on a default selection.

System 200 may also receive grid information 280 as an input. The grid information may define a grid dividing the geographic area to be analyzed into a plurality of cells. The grid information may comprise the number of cells in the grid, the size of each cell, and/or the boundaries of each cell. In some embodiments, a unique consequence probability, expected casualty, and/or other consequence probability value may be determined for each cell in the grid. After consequence probabilities and/or expected casualty values are determined, a data file and/or map may be generated reporting the results for each cell. From these results, together with acceptable risk thresholds (as published by the DoD and FAA), the system could automatically determine ground keep out areas, notices to mariners, and notices to airmen. These can also be used in real-time to evaluate the risk to a specific vessel or aircraft.

The grid information may be provided by a user. Alternatively, the system may be configured to operate based on a predefined or default grid configuration. The system may be configured to dynamically define a grid based on one or more factors, such as the nominal impact point rate.

FIG. 3 illustrates a method 300 for determining expected consequence values for a flight. Method 300 may be performed at a flight risk assessment system, such as system 100 described with respect to FIG. 1, above.

Based on the input information described with respect to FIG. 2, above, impact points may be determined for a plurality of ballistic coefficients, disregarding sources of uncertainty. An impact point for each ballistic coefficient may be determined for each trajectory vector—that is, for each entry in trajectory information 210.

Consequence areas may also be determined for a range of ballistic coefficients based on debris information 260. The casualty area may correspond to the region associated with the impact location of a debris fragment in which a person is presumed to become a casualty. For one or more vehicle failures modes, an impact probability distribution may be determined for each impact point based on a variety of sources of uncertainty affecting debris propagation. Based on the consequence area, the impact probability distribution, and population data, an expected consequence value and/or probability of consequence value may be determined for each combination of trajectory vector and ballistic coefficient.

At step 310, a consequence area (CA) may be determined for an interval of ballistic coefficients. The consequence area may be determined based on debris information 260 and propellant information 230. This is done by integrating the CA density curve vs ballistic coefficient over an interval of ballistic coefficients about the specific ballistic coefficient.

At step 320, impact points may be determined for each combination of trajectory vector and ballistic coefficient. Impact points may be determined based on trajectory information 210 and weather information 270. A numerical "propagator" evaluating the equations of motion is used to step the fragment from breakup to impact, applying gravity drag, and wind forces. The breakup is specified by the position and velocity at the given time along the trajectory. The ballistic coefficient is used to compute the drag force. In some embodiments, wind information may be disregarded in determining impact points.

Nominal impact point rates may also be calculated for each nominal impact point. The impact point rate may be calculated as the distance between each impact point and the previous impact point divided by the difference in time between the state vectors to which each nominal impact point corresponds. For a given source (lift, dv, etc.), the uncertainty radius is the impact rate multiplied by a time constant. The full dispersion size is a combination of all the radii.

At step 330, consequence probability distributions may be determined for each trajectory state vector based on one or more vehicle failure modes. The impact probability distribution may describe the probability of debris impact for areas around the impact point. A vehicle failure mode may correspond to types of vehicle failure that may occur during a launch or reentry, an on-trajectory failure (trajectory breakup), guidance system malfunction (which can result in, for example, an incorrect azimuth), a control system malfunction (which can result in a loss of thrust, other type of failure. In some embodiments, the type of vehicle failure modes for which impact probability distributions are determined may be limited to a predefined set of failure modes.

In some embodiments, an impact probability distribution may be represented as a bivariate Gaussian distribution. In other embodiments, impact dispersions may be represented as other types of distribution, such as Poisson, gamma, beta, Weibull, or other type of distribution. Based on physical modeling and relevant sources of uncertainty, an impact probability distribution may be determined corresponding to the probability of debris landing in areas around the nominal impact point. The distributions can be computed for each different source and combined according to the rules of the distributions (such as root-sum-square of the radii of circular Gaussian) or by numerical integration. In some embodiments, an impact radius or other contour may be determined that corresponds to the 36 value of the distribution. In other embodiments, the impact radius may be defined based on a different number of standard deviations, such as 6σ, 9σ, or other value.

Figure 4:
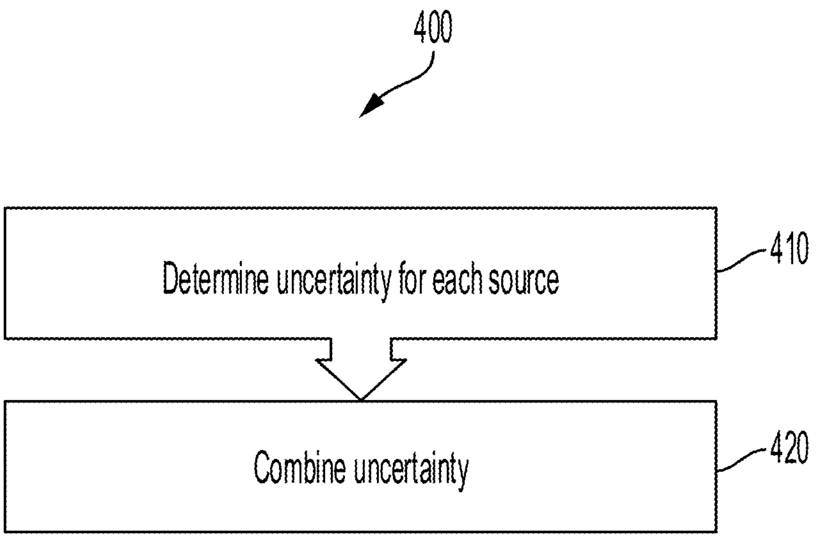
FIG. 4 shows a method for determining uncertainty for a trajectory vector/ballistic coefficient combination, according to some embodiments.

FIG. 4 illustrates a method for determining uncertainty for one trajectory vector/ballistic coefficient combination based on one vehicle failure mode, according to some embodiments. Uncertainty may be determined for each vehicle failure mode for each trajectory vector/ballistic coefficient combination. In some embodiments, uncertainty may be determined as the 3σ value of a bivariate Gaussian distribution.

For each vehicle failure mode, impact probability distributions may be determined based on one or more sources of uncertainty affecting debris propagation. For example, trajectory uncertainty, lift uncertainty, breakup altitude uncertainty, explosive velocity uncertainty, and/or other sources of uncertainty may contribute to the impact probability distribution determination for one or more vehicle failure modes.

Each vehicle failure mode may be defined based on a predefined set of uncertainty sources that substantially affect the impact probability distributions associated with the failure mode, to the exclusion of other uncertainty sources. For example, an impact probability distribution based on an on-trajectory explosion failure mode may be determined based on trajectory uncertainty and explosive velocity uncertainty, and may exclude other sources of uncertainty. An impact probability distribution based on an on-trajectory structural failure breakup may be determined based on trajectory uncertainty and lift and wind uncertainty. An impact probability distribution based on a guidance system malfunction may be determined based on failed flight uncertainty and, in the case of destruct system activation, explosive velocity. An impact probability distribution based on a control system malfunction may be based on a trajectory failed flight uncertainty and structural limit uncertainty. An impact probability distribution based on loss-of-thrust can be based on trajectory uncertainty and breakup altitude uncertainty.

At step 410, uncertainty may be determined for each source of uncertainty associated with the vehicle failure mode. The sources of uncertainty analyzed at step 410 may be based on a predefined set of uncertainties associated with each vehicle failure mode. The uncertainty due to each source may be determined independently and later combined into a total uncertainty.

At step 420, the uncertainty from each uncertainty source may be combined to determine a total uncertainty. The total uncertainty may be determined by calculating the square root of the sum of the squares of each uncertainty source.

A composite consequence probability distribution may be determined for each trajectory vector/ballistic coefficient based on the relative probabilities of each vehicle failure mode occurring at each trajectory vector during an interval of the planned flight trajectory, such as described with respect to failure probability information 220, above. The composite consequence probability may be computed by summing the individual consequence probabilities, where each failure mode consequence probability is weighted by the probability of the failure mode occurring at the state vector.

In some embodiments, for each trajectory vector/ballistic coefficient combination, an consequence probability distribution may be determined assuming each failure mode occurs at each trajectory vector. That is, a conditional consequence probability distribution may be determined for each vehicle failure mode at each trajectory vector, based on a 100% probability that the failure mode occurs at the trajectory vector.

Returning to the method of FIG. 3, at step 340, risk may be determined based on the composite probability distribution.

Figure 5:
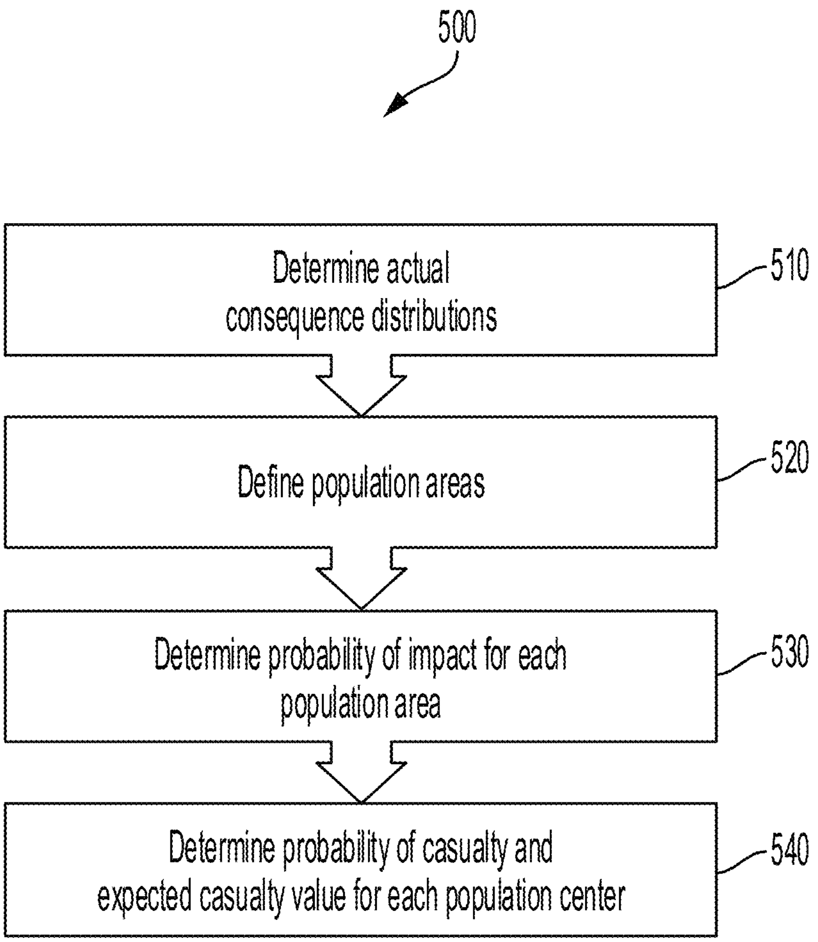
FIG. 5 shows a method for calculating risk associated with a consequence probability distribution, according to some embodiments.
Figure 6:
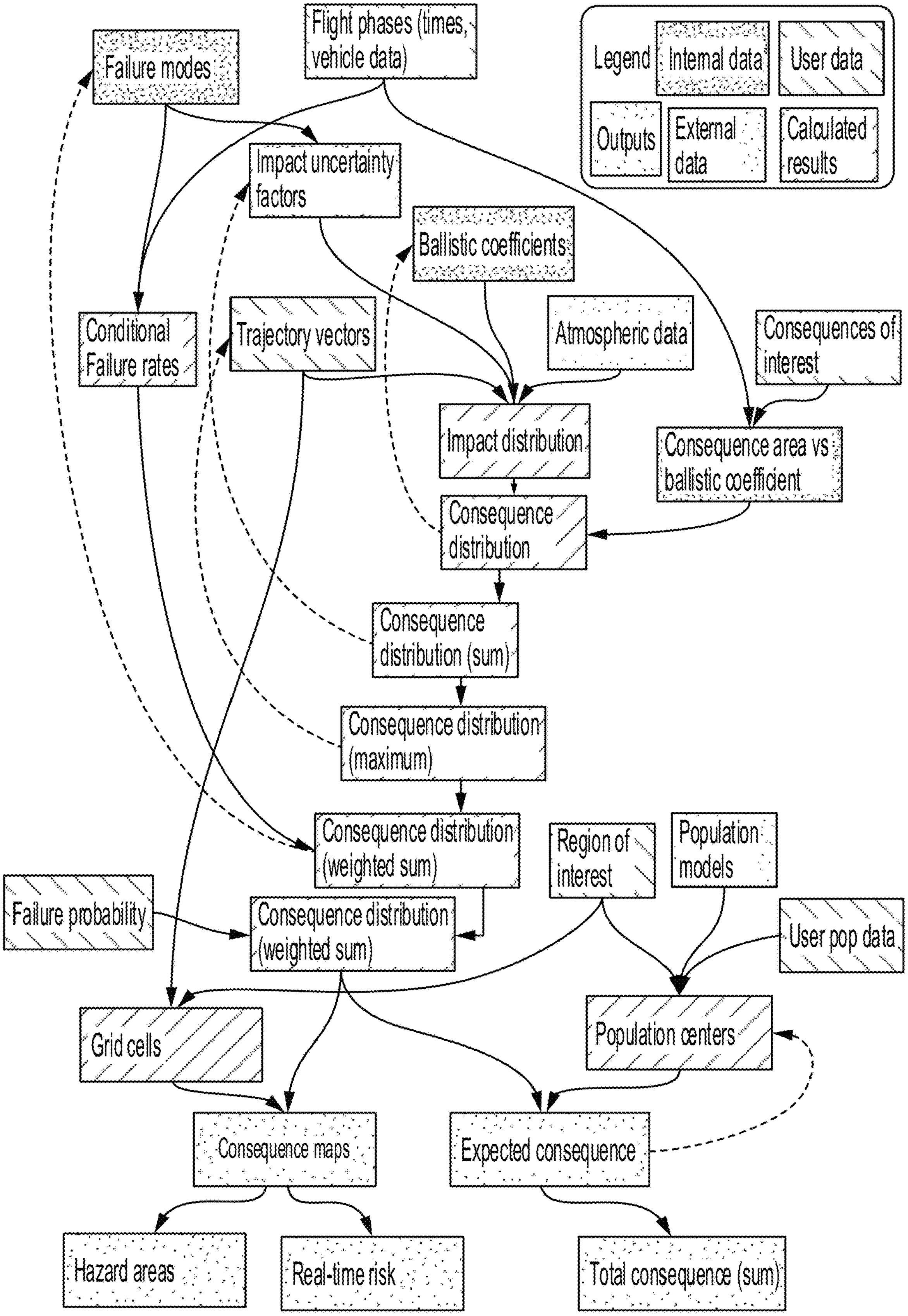
FIG. 6 shows flow chart of how the different elements of the system are interrelated.

FIG. 5 illustrates a method 500 for calculating risk associated with a consequence probability distribution. Risk may be calculated based on the consequence probability distribution, 330, population information 240 and 250, and grid information 280.

For population centers, at step 520, population areas may be defined. As explained above, population information 240 and 250 may describe the number and location of persons in the area near a flight path. Each population center may have an area, A, a location, (x, y), and a population, p, representing the number of persons located in the population center. The consequence probability distribution may be overlaid on the population centers and/or grid.

At step 530, probabilities of consequence, $P_C$, may be calculated for each population center. For each population center, a probability of consequence may be calculated based on the consequence probability distribution integrated over the region of the population center.

Returning to the method of FIG. 5, at step 540, a probability of consequence ($P_C$) value and conditional expected consequence ($CE_C$) value may be calculated for each population area. The probability of consequence and conditional expected consequence values may be calculated according to the following equation, where p is the population of the cell:

$$CE_C = p \times P_C(A,x,y)$$

The total expected consequence value may be determined by adding together the conditional expected consequence value for each population area and multiplying by the probability of a failure during the trajectory interval. This process may be repeated for each consequence of interest.

For grids, at step 520, the grid data input may be used to divide the earth into grid cells. Each cell may correspond to a two-dimensional region. As explained above, each cell may have a probability of consequence, $P_C$, based on the value of the composite consequence probability distribution integrated over the cell area.

Returning to the method of FIG. 3, at step 350, an output may be generated. The output may comprise one or more data files and/or one or more images.

The output may include expected consequence, such as casualty, values for a single mission or a family of missions. The output may include probability of consequence values for each grid cell, such as defined by grid information 280, and/or expected consequence values for each population center, such as defined by the local and general population information. The output may include expected consequence values based on different categories of people. For example, the output may include an expected casualty or fatality value for mission involved personnel, government personnel, the general public, and/or other categories of persons.

The output may comprise one or more data files comprising a plurality of entries. In some embodiments, each entry may correspond to a geographic region or grid cell, such as defined by grid information 280, described above. Each entry may comprise a population density value, such as described with respect to general and local population information 240 and 250, above, and an impact probability value. Each entry may also comprise one or more expected consequence values. Each entry may include expected consequence values based on each impact probability distribution and/or the total expected consequence values for the corresponding cell or population center.

In some embodiments, a composite map may be made rendering the value of the consequence at each grid cell location with different colors or symbols.

The output may also comprise coordinate values defining one or more hazard areas. In some embodiments, the system may associate together one or more data entries corresponding to grid cells and/or population centers based on consequence probability, probability of casualty, and/or expected casualty values for each cell and/or population center. For example, the system may associate together all population centers with an expected casualty value above a predefined level. Alternatively, population centers having an expected casualty value within a predefined range may be associated together. The values by which grid cells and/or population centers are associated may be selected based on an input from a user, may be selected based on a default value, or may be selected based on another source, such as relevant government regulations. The output data file may comprise coordinate values that define the geographic boundaries of such groups of population centers to define hazard areas and/or keep-out areas that may be reported to relevant authorities.

In some embodiments, a composite map may be made rendering the value of the consequence at each grid cell location with different colors or symbols.

The output may define multiple hazard areas. For example, the output may include a hazard area that corresponds to a keep out area for people. Alternatively, the output may include a hazard area that corresponds to a keep out area for vehicles, such as ships or other aircraft. Different hazard areas may be defined based on different criteria. For example, a keep out area for people may correspond to a region having a probability of casualty greater than a first value. A keep out area for ships may correspond to a region having a probability of casualty greater than a second value, which may be different from the first value. This may be based on a different casualty area density curve that accounts for the vulnerability of people who are on waterborne vessels or in aircraft.

The output may comprise data corresponding to a single mission or to a family of missions. For example, the output may comprise a plurality of data files, each data file corresponding to a single flight within a family of missions. Alternatively, the output may comprise one data file that comprises a plurality of consequence probabilities and expected casualty values for a family of missions.

The format of the output may be customized, such as according to input from a user, to facilitate use and/or interpretation of the data. For example, the data entries may be sorted by consequence probability, probability of casualty, expected casualty, and/or other value to display the entries with the highest values first. In this way, a user may quickly see population centers that contribute the most risk to a mission.

The output may comprise one or more images, such as described with respect to FIGS. 7-9, below.

Figure 7:
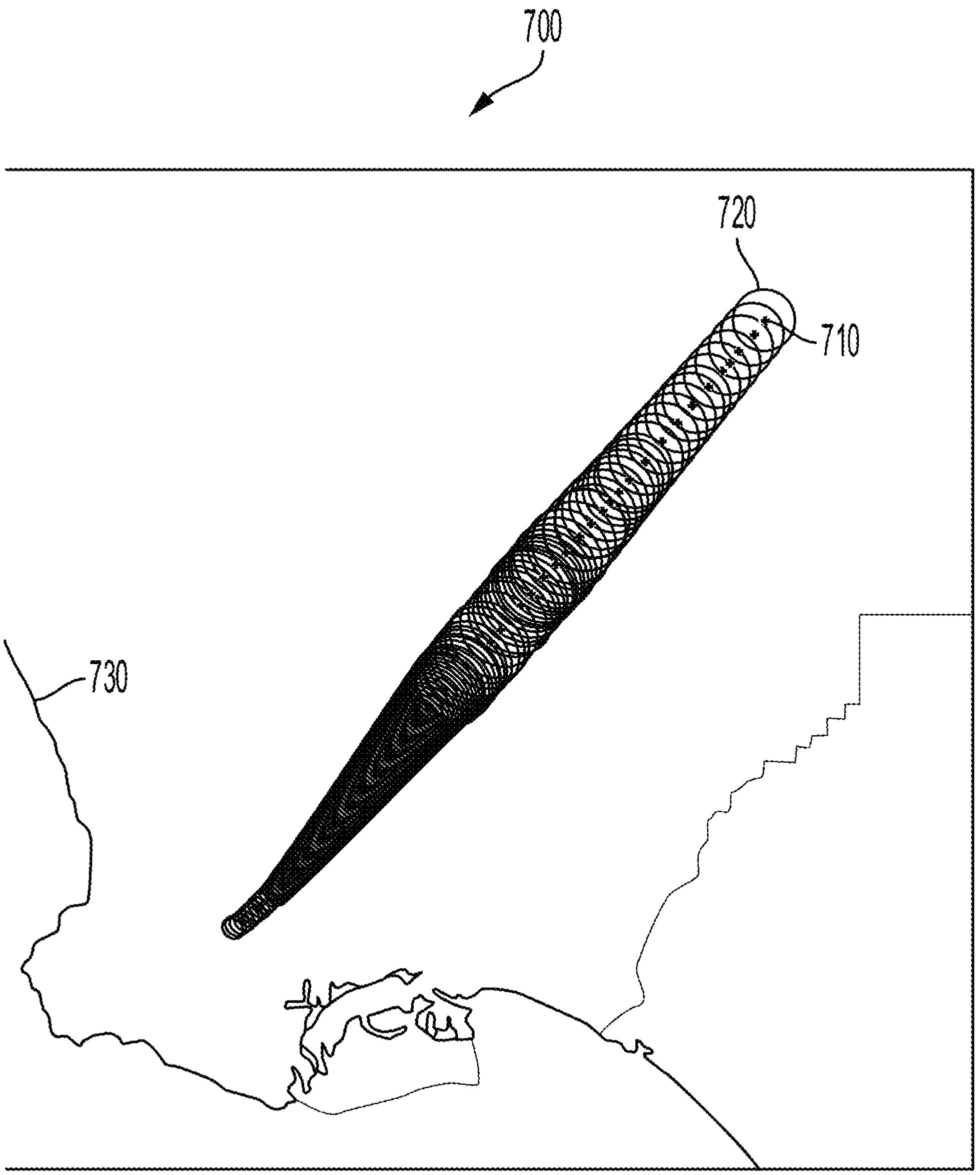
FIG. 7 shows an impact dispersion map, according to some embodiments.

FIG. 7 shows an impact dispersion map 700, according to some embodiments. The impact dispersion map shows a plurality of impacts points, such as impact point 710, and corresponding impact dispersion uncertainties, such as uncertainty boundary 720.

An impact dispersion map may show nominal or actual impact points and an uncertainty boundary associated with each impact point. An uncertainty boundary may be based on one or more impact probability distributions associated with the impact point. In some embodiments, uncertainty boundaries may correspond to the 3σ value of a corresponding impact probability distribution. In other embodiments, uncertainty boundaries may correspond to other uncertainty values, such as 1σ, 6σ, 9σ, or other uncertainty value. In some embodiments, an uncertainty boundary may be a circle. In other embodiments, an uncertainty boundary may have an elongated shape to indicate greater uncertainty in a downrange direction than in a crossrange direction.

An impact dispersion map may also include one or more map features 730, which may indicate a political boundary, such as national, state, or local boundary, or other features, such as buildings, roads, infrastructure, terrain features, or other features. Information describing the nature and/or location of the map features may be included in population data, such as local or general population data described with respect to FIG. 2, above, or may be received from another data source, such as a map database. Map features may be based on data provided by a user or may be included in mapping software utilized by the system. The resolution of the map may vary, such as based on the resolution of the general population information used by the system and/or the resolution of the local population information provided by a user.

Figure 8:
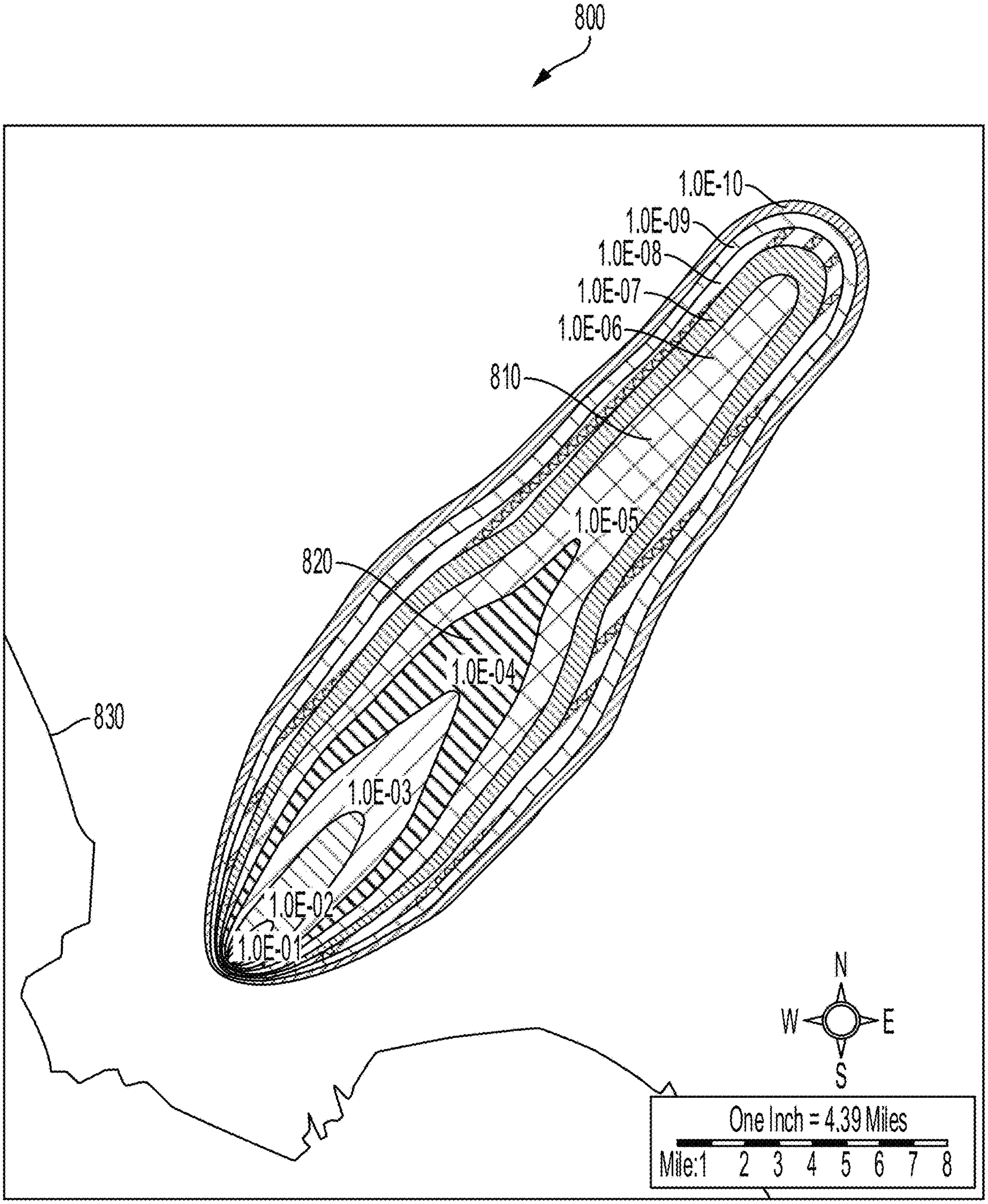
FIG. 8 shows a first example of a hazard area map, according to some embodiments.

FIG. 8 shows a first example of a hazard area map 800, according to some embodiments. A hazard area map may include one or more hazard areas 810 and one or more hazard values 820. Each hazard value may be associated with a hazard area.

As described above, the system may associate together one or more data entries corresponding to grid cells and/or population centers based on consequence probability, probability of casualty, and/or expected casualty values for each cell and/or population center. An output data file may comprise coordinate values that define the geographic boundaries of such groups of grid cells and/or population centers to define hazard areas.

A hazard map may show hazard areas, such as defined by the boundary coordinates. A hazard map may include one or more hazard areas defined by the boundary coordinates. Each hazard area 810 may correspond to a region having a consequence probability, probability of casualty, and/or expected casualty value greater than a predefined value. Alternatively, each hazard area may correspond to a region having a consequence probability, probability of casualty, and/or expected casualty value within a predefined range.

A hazard map may also show one or more hazard values 820 corresponding to each hazard area. A hazard value may comprise a consequence probability, probability of casualty, and/or expected casualty value associated with a hazard area. Each hazard area may comprise a different color corresponding to the associated hazard value.

A hazard map may also include one or more map features 830, which may indicate a political boundary, such as national, state, or local boundary, or other features, such as buildings, roads, infrastructure, terrain features, or other features. Information describing the nature and/or location of the map features may be included in population data or may be received from another data source. Map features may be provided by a user or may be included in mapping software utilized by the system. The resolution of the map may vary, such as based on the resolution of the general population information used by the system and/or the resolution of the local population information provided by a user.

In some embodiments, a hazard map may display a hazard region as a continuous region defined by boundary coordinates. Alternatively, a hazard map may display a plurality of hazard points, such as defined by each grid cell and/or population center.

Figure 9:
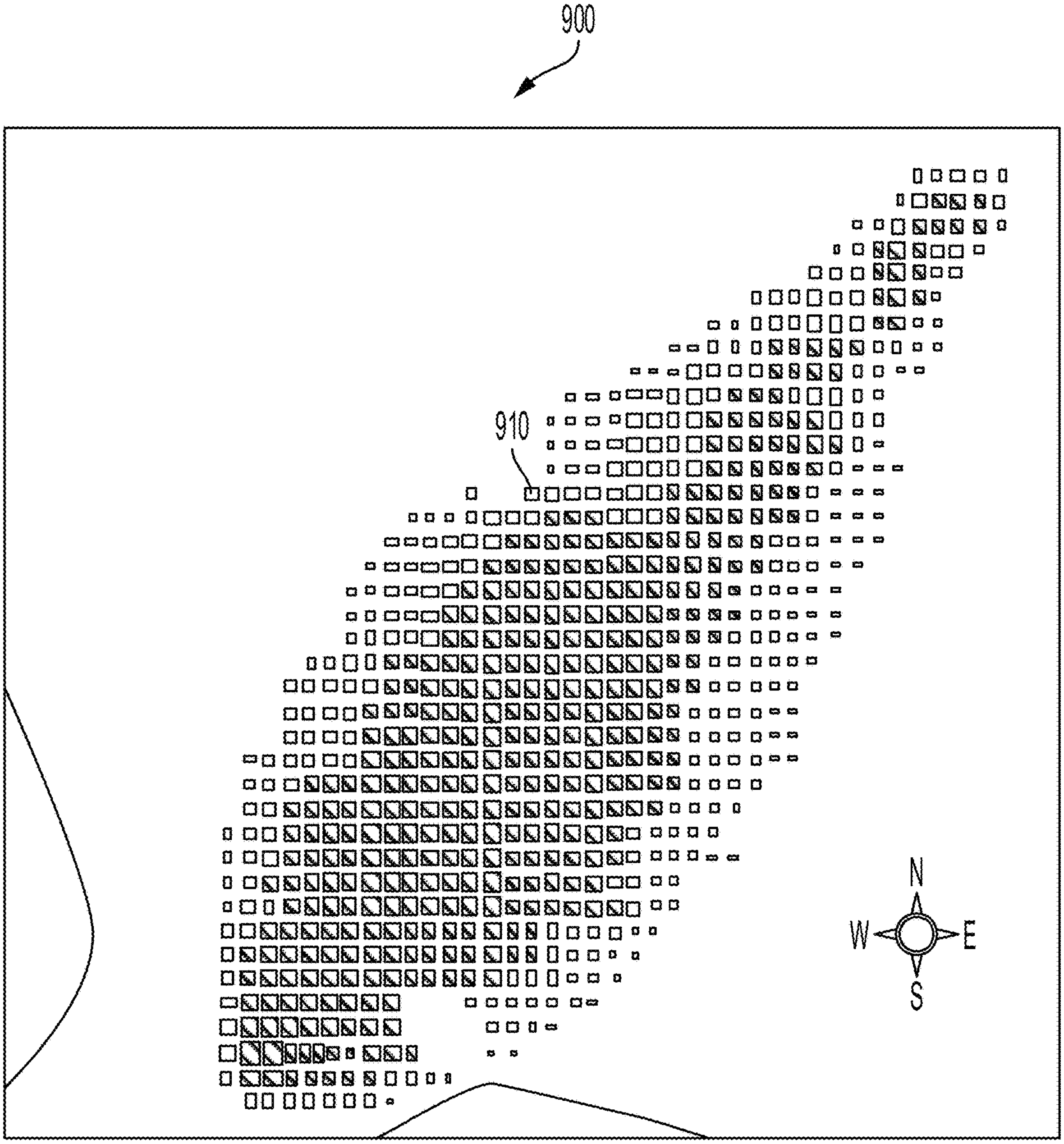
FIG. 9 shows a second example of a hazard area map, according to some embodiments.

FIG. 9 shows a second example of a hazard map 900, according to some embodiments. The map may include one or more hazard points 910. Each hazard point may correspond to a grid cell or population center, such as defined by grid information 280 and/or population information 240 or 250. Each hazard point may correspond to an entry in an output data file. Each hazard point may comprise a color corresponding a consequence probability, probability of casualty, and/or expected casualty value associated with the hazard point. For example, a color may be selected for a hazard point based on a determination that the hazard point has an consequence probability, probability of casualty, and/or expected casualty value greater than a predefined value. Alternatively, a color may be selected for a hazard point based on a determination that the hazard point has an consequence probability, probability of casualty, and/or expected casualty value within a predefined range.

The output may be used to make decisions regarding a planned launch or reentry. For example, if the total expected casualty value is below a predefined level, a user may decide to proceed with the launch or reentry. Alternatively, if the total expected casualty value is above a predefined level, a user may decide to cancel, or postpone the mission. A user may also redesign one or more aspects of the mission to mitigate risk. For example, the planned trajectory of a flight may be redesigned to avoid a population center that contributed a significant amount to the total expected casualty value. If the total expected casualty value is above a predefined level, such a government mandated threshold, a user may decide to seek a waiver from a relevant government entity, such as the FAA or the Coast Guard.

Figure 10:
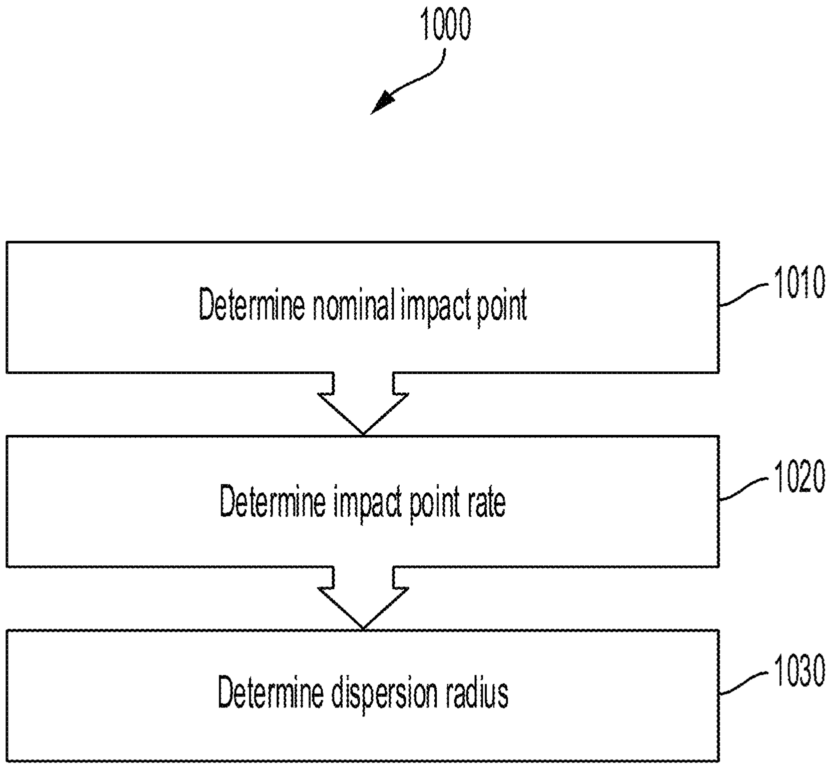
FIG. 10 shows a method for calculating trajectory uncertainty, according to some embodiments.
Figure 11:
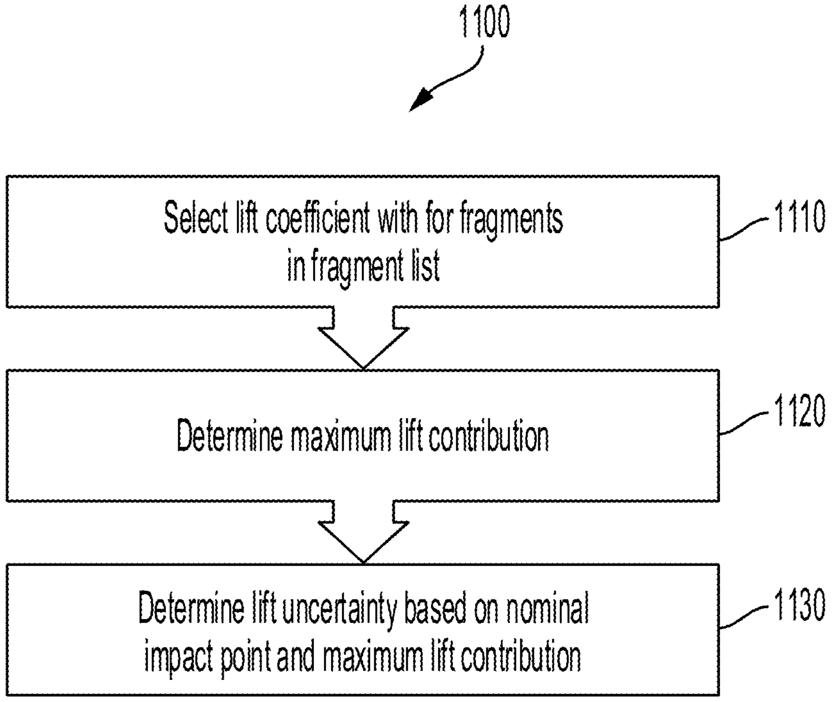
FIG. 11 shows a method for calculating lift uncertainty, according to some embodiments.
Figure 12:
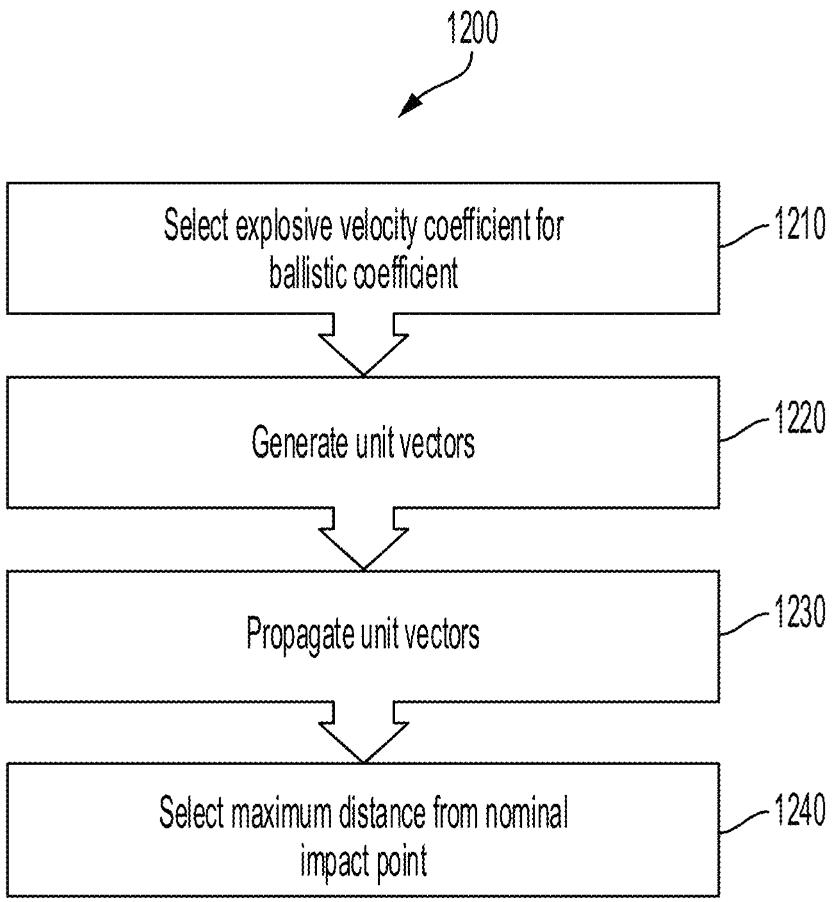
FIG. 12 shows a method for calculating explosive velocity uncertainty, according to some embodiments.

FIGS. 10-12 illustrate methods for calculating uncertainty associated with different uncertainty sources, according to some embodiments.

FIG. 10 illustrates a method 1000 for calculating trajectory uncertainty, according to some embodiments. The method may be performed for one trajectory vector/ballistic coefficient combination. The method provides for determining an impact point and scaling factor for each ballistic coefficient at each trajectory vector.

At step 1010, a nominal impact point may be determined for each ballistic coefficient at each nominal trajectory vector. The nominal impact points may be determined based on trajectory information 210 and atmospheric data, such as provided in weather information 270. In some embodiments, wind information may be disregarded in determining nominal impact points.

At step 1020, an impact point rate may be calculated for each nominal impact point. An impact point rate may be calculated as the distance between each impact point and the previous impact point divided by the difference in time between the state vectors to which each impact point corresponds.

At step 1030, trajectory uncertainty may be determined based on the following equation, where n is the state vector number, $\overline{IP_n}$ is the impact point position vector, Δt is the time difference between state vectors, and $t_{const}$ a scaling factor:

$$TU_n = \frac{|\overline{IP_n} - \overline{IP_{n-1}}|}{\Delta t} \times t_{const}$$

In some embodiments, the dispersion radius or contour may correspond to a 3σ uncertainty. The dispersion radius may correspond to other uncertainty values, such as 1σ, 6σ, 9σ, or other uncertainty value. The time constant may be selected such that the dispersion radius corresponds to a certain uncertainty value. For example, the time constant may selected such that the dispersion radius corresponds to a 3σ uncertainty value.

FIG. 11 illustrates a method 1100 for calculating lift uncertainty, according to some embodiments. The method provides for determining a maximum lift contribution to uncertainty and a scaling factor.

At step 1110, each fragment in a fragment list is attributed a coefficient which corresponds to the lift generated during fall due to the drag on the fragment.

At step 1120, the maximum amount of lift contribution to uncertainty is calculated.

At step 1130, lift uncertainty is determined for each trajectory vector by calculating the distance between the nominal impact point associated with each state vector with the lift corrected impact point based on the maximum lift contribution. The distance may be multiplied by a constant to determine uncertainty. In some embodiments, the constant may be selected based on a calibration process.

FIG. 12 illustrates a method 1200 for calculating explosive velocity uncertainty, according to some embodiments. The method may be performed for one trajectory vector/ballistic coefficient combination having a nominal impact point.

The method provides for determining an explosive velocity coefficient and applying the coefficient to a plurality of vectors around a sphere centered at the position vector of a state vector. Each vector may be propagated to the ground based on physical modeling, and the uncertainty may be determined as the propagated impact point having the greatest distance from the nominal impact point associated with the trajectory vector/ballistic coefficient combination.

At step 1210, an explosive velocity value may be determined for the a ballistic coefficient. In some embodiments, a explosive velocity coefficient may be obtained from a lookup table. The lookup table may comprise values corresponding to an enveloping curve, such as described with respect to FIG. 13, below, for a plurality of debris fragments and ballistic coefficients. An explosive velocity value may be determined based on the coefficient selected from the lookup table.

Figure 13:
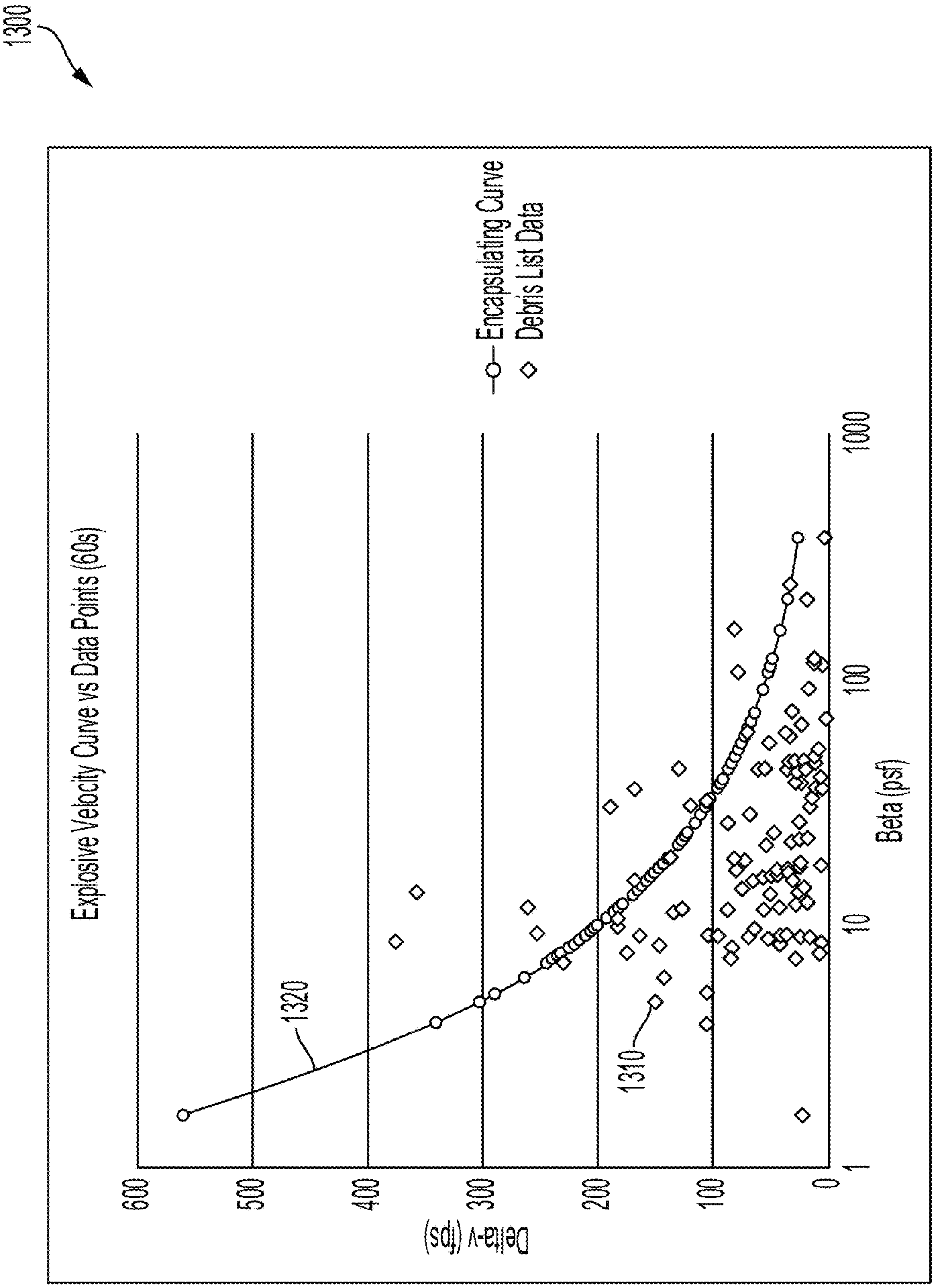
FIG. 13 shows an explosive velocity plot, according to some embodiments.

FIG. 13 shows an explosive velocity plot 1300, according to some embodiments. The plot includes a plurality of data points 1310. Each data point may correspond to a debris fragment. For each debris fragment at each ballistic coefficient, an explosive velocity value may be obtained, either empirically or by modeling, corresponding to a propellant. For example, the plot may include explosive velocities for fragments based on a liquid propellant.

The plot includes an explosive velocity enveloping curve 1320. In some embodiments, the curve may be a decreasing exponential curve fit to the data points. In some embodiments, the curve may be defined such that, for any ballistic coefficient, the explosive velocity value of the curve is greater than the explosive velocity for any data point at the same ballistic coefficient.

Returning to the method of FIG. 12, at step 1220, a plurality of unit vectors may be generated originating at the state vector position. The unit vectors may be uniformly distributed about a sphere surrounding the state vector position.

At step 1230, each unit vector may be combined with the explosive velocity determined at step 1210 above and the state vector velocity and propagated to the ground to determine an actual impact point. An actual impact point may be determined for each unit vector.

At step 1240, the distance from each actual impact point to the nominal impact point may be calculated. The explosive velocity uncertainty may be determined by multiplying the greatest distance between an actual impact point and the nominal impact point by a constant. In some embodiments, the constant may be selected based on a calibration process.

User Interface

FIGS. 14-26 show various graphical user interfaces 1400-2600 for configuring and using a flight risk assessment system, in accordance with some embodiments. The interfaces allow a user to select input data to be used for flight risk analysis from one or more sources and/or provide information regarding a flight to be analyzed. The interfaces also allow a user to view the results of an analysis.

In some embodiments, interfaces 1400-2600 may be displayed by output device 130 of system 100, described with respect to FIG. 1, above. In other embodiments, interfaces 1400-2600 may be displayed by any electronic computing device, such as a laptop computer, desktop computer, smart-phone, tablet, or other electronic computing device configured to display one or more of interfaces 1400-2600 and to receive one or more inputs from a user, as discussed herein, to control the operation of the interface and operation of a flight risk assessment system. In some embodiments, execution of all or part of method 300, as discussed above, may include displaying one or more of the interfaces shown in FIGS. 14-26.

Below, interfaces 1400-2600 are discussed with respect to FIGS. 14-26 in greater detail. Interfaces 1400-2600 may, in some embodiments, be interrelated interfaces of a single program or application configured to be used in connection with one another. For example, each of the interfaces 1400-2600 may be different screens that are selectively accessible from a web application or computer program configured to work in conjunction with one or more electronic devices in order to configure and use a flight risk assessment system.

Figure 14:
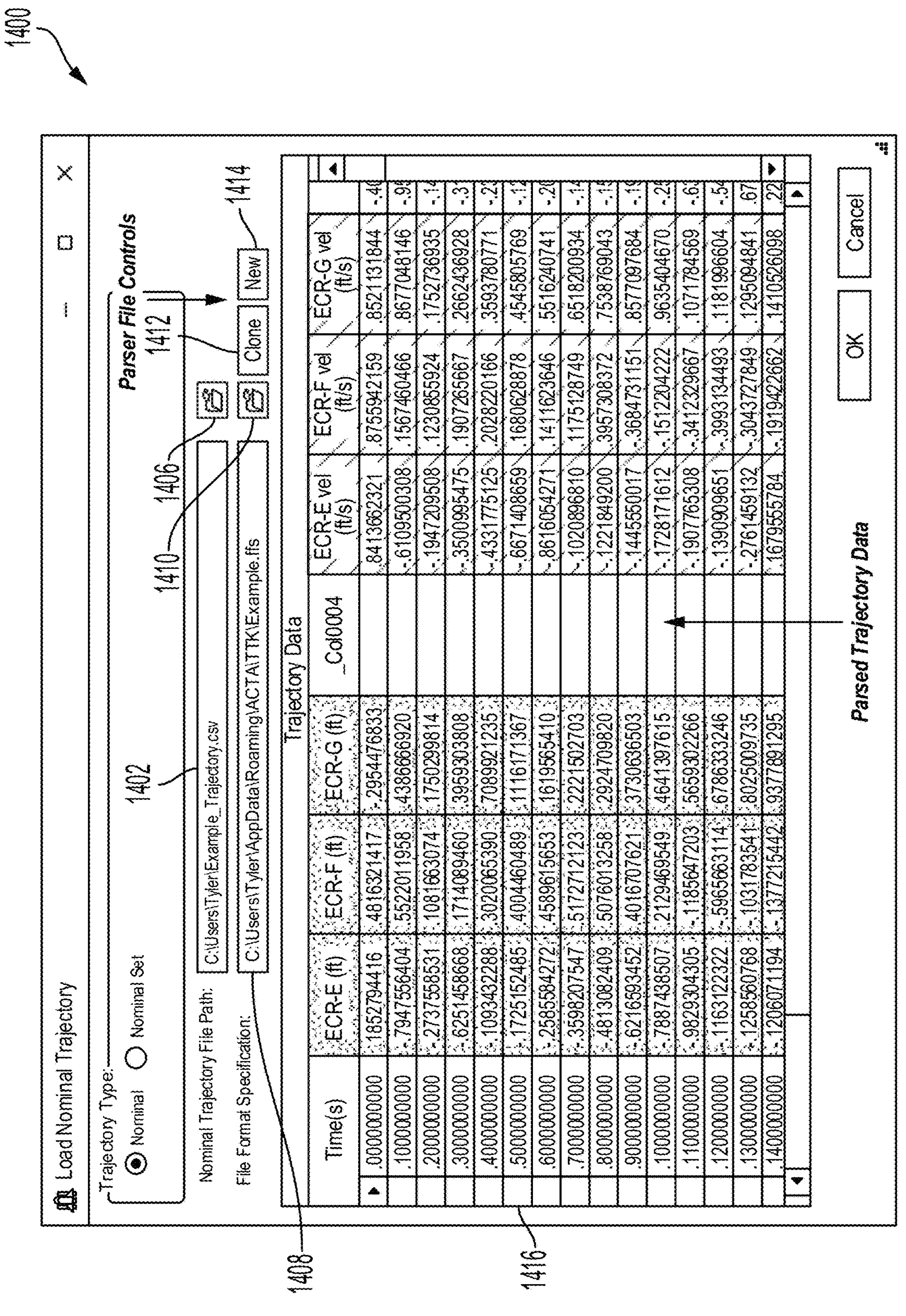
FIG. 14 shows a trajectory interface, according to some embodiments.

FIG. 14 shows a trajectory interface 1400, according to some embodiments. Trajectory interface 1400 may, in some embodiments, be an interface configured to allow a user to select a trajectory file comprising trajectory information to be used as an input to a flight risk assessment system, select a trajectory format specification, which may instruct a system how to interpret a trajectory file based on a predefined specification, and/or create a new trajectory format specification for interpreting a trajectory file.

Trajectory interface 1400 may include a trajectory field 1402. A trajectory field may be an input field configured to receive input from a user specifying a trajectory file to be used in a flight risk assessment. A trajectory field may be configured to receive input in the form of text, such as a file name or a file path indicating the location of a trajectory file in storage. Trajectory interface 1400 may also include a trajectory browse icon 1406. A trajectory browse icon may be an interactive affordance, in that it may be clicked, tapped, pressed, or otherwise selected to cause the system to display a second user interface enabling a user to navigate to a storage location containing a trajectory file and select a trajectory file, rather than identifying the trajectory file via trajectory field 1402. The interface may be configured to automatically populate trajectory field 1402 based on the user's navigation and file selection in response to selecting trajectory browse icon 1406.

Trajectory interface 1400 may also include a specification field 1408. A specification field may be an input field configured to receive an input from a user specifying a specification file containing information indicating how a trajectory file is formatted. A specification field may be configured to receive input in the form of text, such as a file name or a file path indicating the location of a specification file in storage. Trajectory interface 1400 may also include a specification browse icon 1410. A specification browse icon may be an interactive affordance, in that it may be clicked, tapped, pressed, or otherwise selected to cause the system to display a second user interface enabling a user to navigate to a storage location containing a specification file and select a specification file, rather than identifying the specification file via trajectory field 1402. The interface may be configured to automatically populate specification field 1408 based on the user's navigation and file selection in response to selecting specification browse icon 1410.

Trajectory interface 1400 may also allow a user to create a copy of a specification file, modify an existing specification file, and/or save the modified specification file to memory. Trajectory interface 1400 may include a specification modification icon 1412. Specification modification icon 1412 may be an interactive affordance, in that it may be clicked, tapped, pressed, or otherwise selected to cause the system to display a specification configuration interface, such as described with respect to FIGS. 15A-15C, below, which may be pre-populated with information included in a file indicated in specification field 1408.

Trajectory interface 1400 may also allow user to create a new specification file. Trajectory interface 1400 may include a specification creation icon 1414. Specification creation icon 1414 may be an interactive affordance, in that it may be clicked, tapped, pressed, or otherwise selected to cause the system to display a specification configuration interface which may allow a user to define a new specification file.

Trajectory interface 1400 may also include trajectory data field 1416. A trajectory data field may display trajectory data. The trajectory data displayed by trajectory data field 1416 may be based on the trajectory file indicated by trajectory field 1402. The trajectory data field may be dynamically populated in response information in trajectory field 1402 and/or specification field 1408. For example, in response to user selections of a trajectory file and specification file, the trajectory interface may be configured to automatically populate the trajectory data field based on the trajectory file and specification file. The trajectory interface may display information contained in the trajectory file based on formatting information contained in the specification file. If a user selects a different trajectory or specification file, the trajectory interface may be configured to automatically update the trajectory data field in response to the updated selection.

Figure 15A:
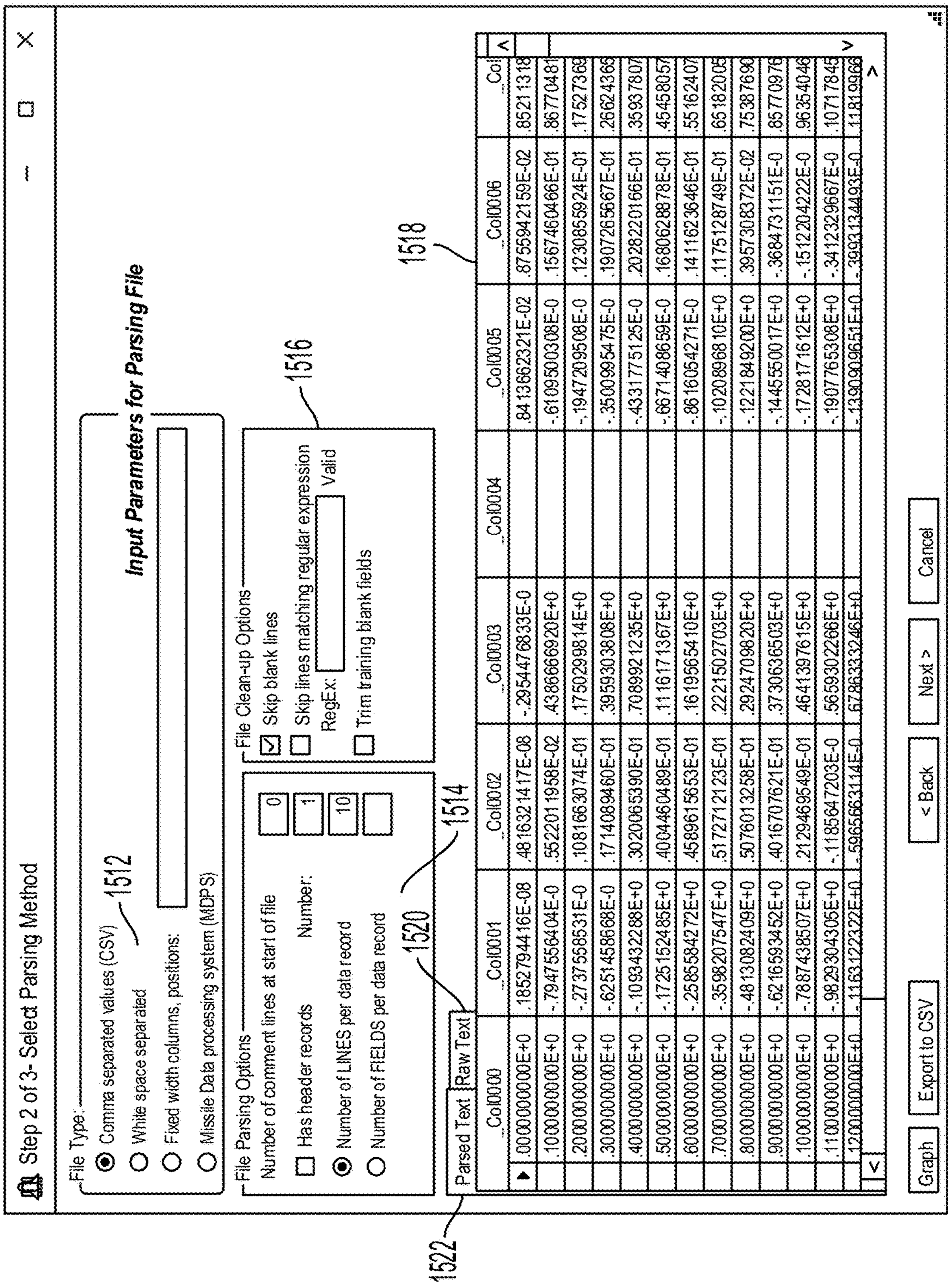
FIGS. 15A-15C show aspects of a specification configuration interface, according to some embodiments.
Figure 15B:
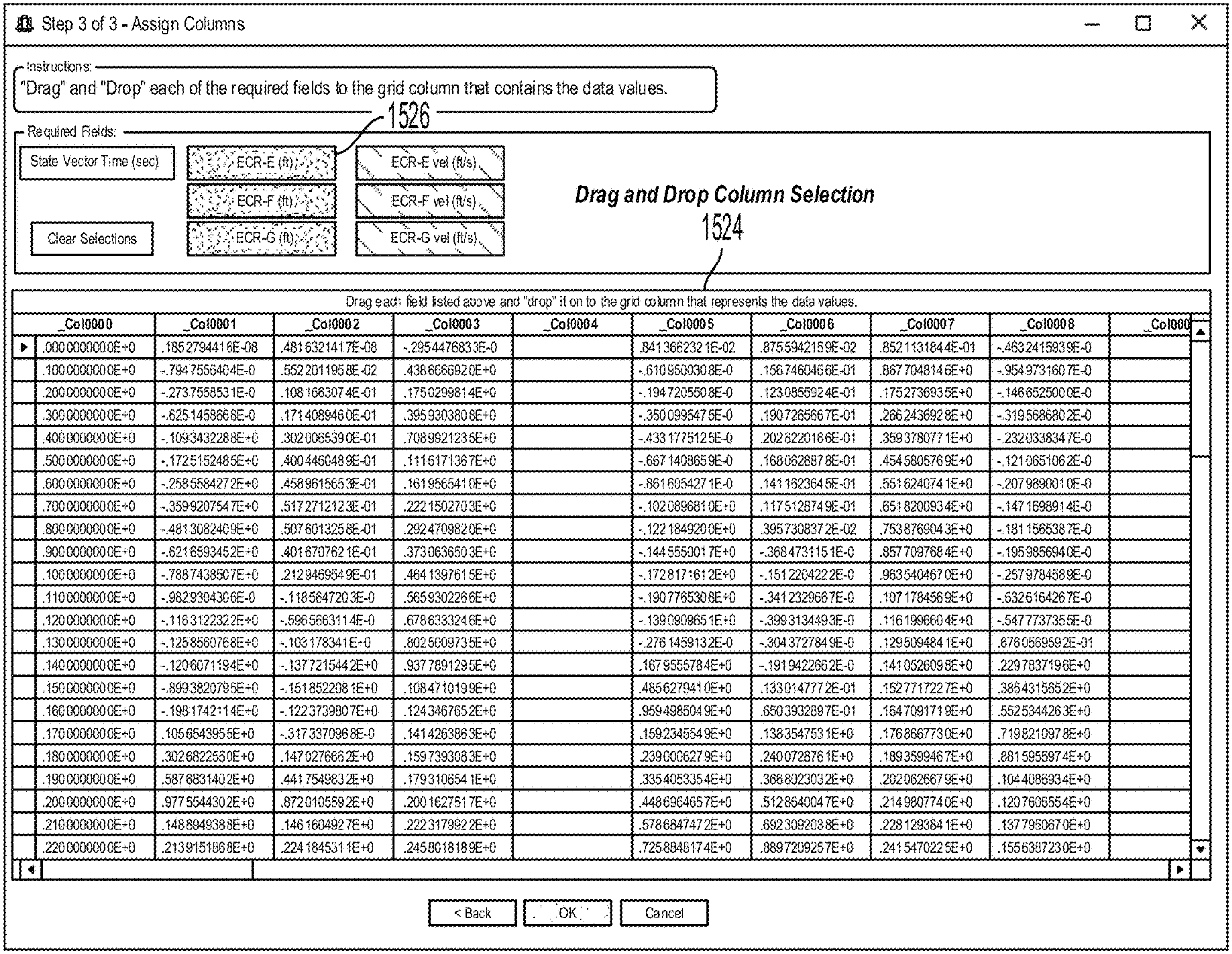
Figure 15C:
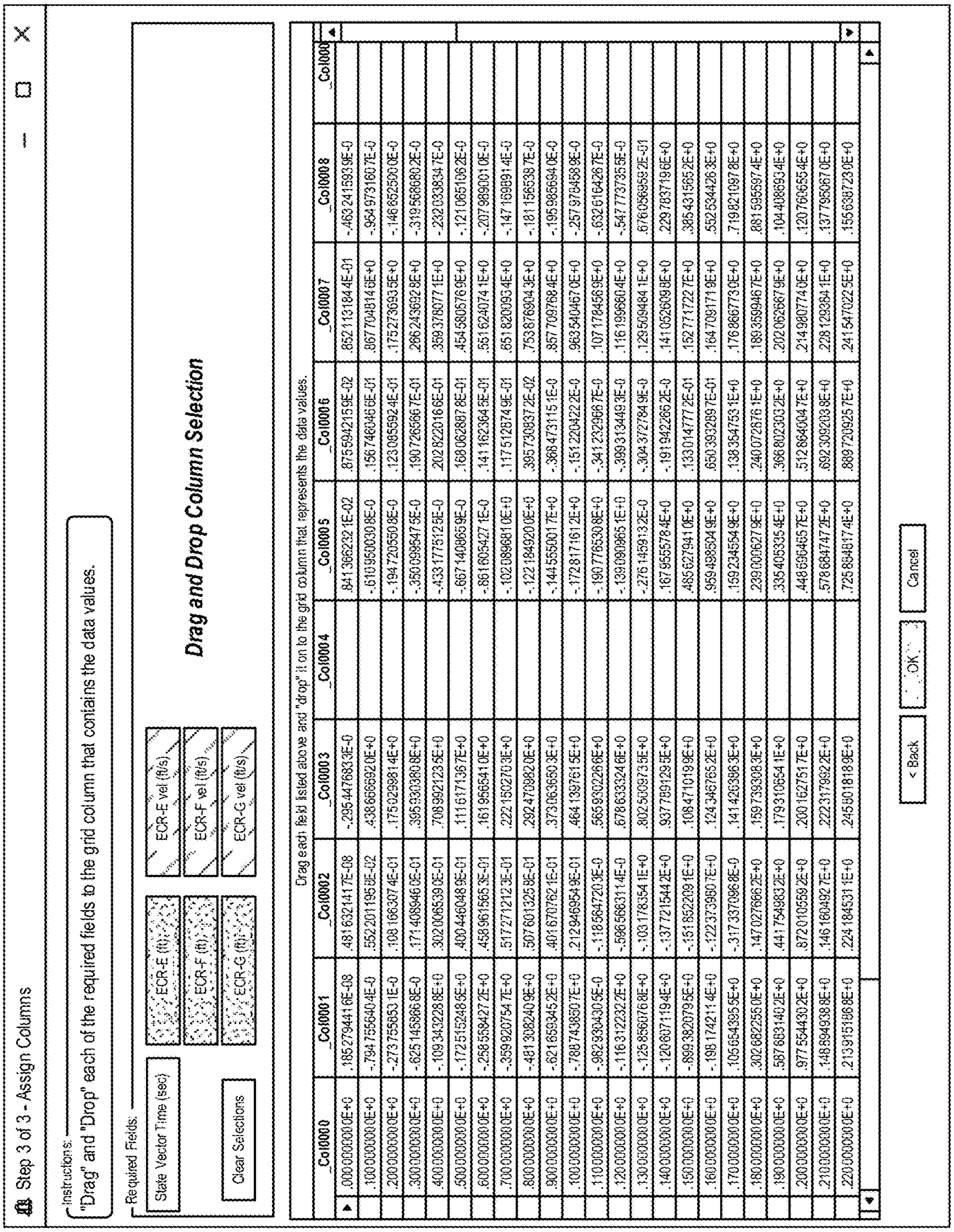

FIGS. 15A-15C show various aspects of a specification configuration interface, according to some embodiments. In some embodiments, the features of FIGS. 15A-15C may be included in separate interfaces. In other embodiments, the features of FIGS. 15A-15C may be included in a single interface.

A specification configuration interface may be displayed in response to a user selection of a specification creation icon or a specification modification icon, such as described with respect to FIG. 14, above. If the specification configuration interface is displayed in response to a user selection of a specification modification icon, the features of FIGS. 15A-15C may be pre-populated based on information contained in the file specified in specification field 1408, described with reference to FIG. 14, above. If the specification configuration interface is displayed in response to a user selection of a specification creation icon, the features of FIGS. 15A-15C may be pre-populated with default values or may be empty.

FIG. 15A shows a first aspect of a specification configuration interface, according to some embodiments. The interface may include a position coordinate system field 1502, a position unit field 1504, a velocity coordinate system field 1506, and a velocity unit field 1508. The position coordinate field may be an input configured to allow a user to select a coordinate system on which position information contained in a trajectory file is based. Position information included in a trajectory file may be expressed as latitude-longitude-altitude coordinates, as earth-centered or earth-fixed coordinates, as local tangent plane coordinates, or as other set of coordinate values to identify the position of the vehicle at each time during the launch or reentry. The position coordinate field may be an input, such as a drop-down box, radio buttons, check boxes, and/or other type of input field, that allows a user to select a coordinate system on which position information in a trajectory file is based. Similarly, position information contained in a trajectory file may be expressed in different units. The position unit field may be an input, such as a drop-down box, radio buttons, check boxes, and/or other type of input field, that allows a user to select a unit on which position information in a trajectory file is based.

The velocity coordinate field may be an input configured to allow a user to select a coordinate system on which velocity information contained in a trajectory file is based. Velocity information included in a trajectory file may be expressed as latitude-longitude-altitude coordinates, as earth-centered or earth-fixed coordinates, as local tangent plane coordinates, or as other set of coordinate values to identify the direction of the vehicle at each time during the launch or reentry. The velocity coordinate field may be an input, such as a drop-down box, radio buttons, check boxes, and/or other type of input field, that allows a user to select a coordinate system on which velocity information in a trajectory file is based. Similarly, velocity information contained in a trajectory file may be expressed in different units. The velocity unit field may be an input, such as a drop-down box, radio buttons, check boxes, and/or other type of input field, that allows a user to select a unit on which velocity information in a trajectory file is based.

The interface of FIG. 15A may also include a data field 1510. The data field may display information contained in a trajectory file.

FIG. 15B shows a second aspect of a specification configuration interface, according to some embodiments. The interface may allow a user to input information indicating how a trajectory file should be parsed by a flight risk assessment system. The interface may include a file type field 1512, a parsing options field 1514, and a cleanup field 1516.

File type field 1512 may be an input, such as a drop-down box, radio buttons, check boxes, and/or other type of input field, that allows a user to indicate the file type of a trajectory file. For example, a user may indicate that a trajectory file is a Comma Separated Value (CSV) file, missile data processing (MDPS) file, and/or other file type. In some embodiments, the interface may allow a user to define a custom file type.

Parsing options field 1514 may be an input, such as a drop-down box, radio buttons, check boxes, and/or other type of input field, that allows a user to identify other characteristics of a trajectory file relevant to parsing. For example, the interface may allow a user to specify a number of comment lines at the beginning of a file, whether and how many header records are associated with a file, a number of data lines per record, a number of fields per data record, and/or other characteristics of a data file.

Cleanup field 1516 may be an input, such as a drop-down box, radio buttons, check boxes, and/or other type of input field, to allow a user to indicate additional preferences as to how a trajectory field should be parsed. For example, a user may indicate that a parser should skip blank lines, skip lines matching a regular expression, trim trailing blank fields, and/or other preference.

The interface of FIG. 15B may also include a data field 1518. The data field may display information contained in a trajectory file. Data field 1518 may include a raw text tab 1520. Raw text tab 1520 may be an interactive affordance, in that it may be clicked, tapped, pressed, or otherwise selected to cause the system to display, in data field 1518, unparsed data from a trajectory file. Data field 1518 may also include a parsed text tab 1522. Parsed text tab 1522 may be an interactive affordance, in that it may be clicked, tapped, pressed, or otherwise selected to cause the system to display, in data field 1518, data from a trajectory file that has been parsed based on user input to the specification configuration interface. Data field 1518 may configured to dynamically update displayed data as a user modifies selections in the various input field of the specification configuration interface.

FIG. 15C shows a third aspect of a specification configuration interface, according to some embodiments. The interface may allow a user to identify the type of information contained in one or more segments of a parsed trajectory file. The interface may include a data field 1524. The data field may display parsed data from a trajectory file. The interface may also include one or more data label inputs 1526. A data label input may be an input, such as a drop-down box, radio buttons, check boxes, and/or other type of input field, that allows a user to identify the type of data contained in one or more segments of a parsed trajectory file, such as a column, row, or other segment. The available input options for a data label input may be dynamically populated based on the coordinate and unit input fields, such as described with respect to FIG. 15A, above. For example, if a user identified earth-centered rotational as the position coordinate system, a data label input may include options for three dimensions associated with the coordinate system. A user may identify a segment of the parsed trajectory data as comprising data associated with a dimension of the coordinate system.

In other embodiments, the interface may include a drag and drop feature to allow a user to identify data contained in one or more segments of parsed trajectory data. For example, in the example of FIG. 15C, the interface may display seven data labels, corresponding to time, and three dimensions each corresponding to position and velocity. A user may select a data label, such as by clicking, tapping, pressing, or otherwise selecting a data label, and move the label to a segment of data in data field 1524 to identify the type of data contained in the segment.

Figure 16:
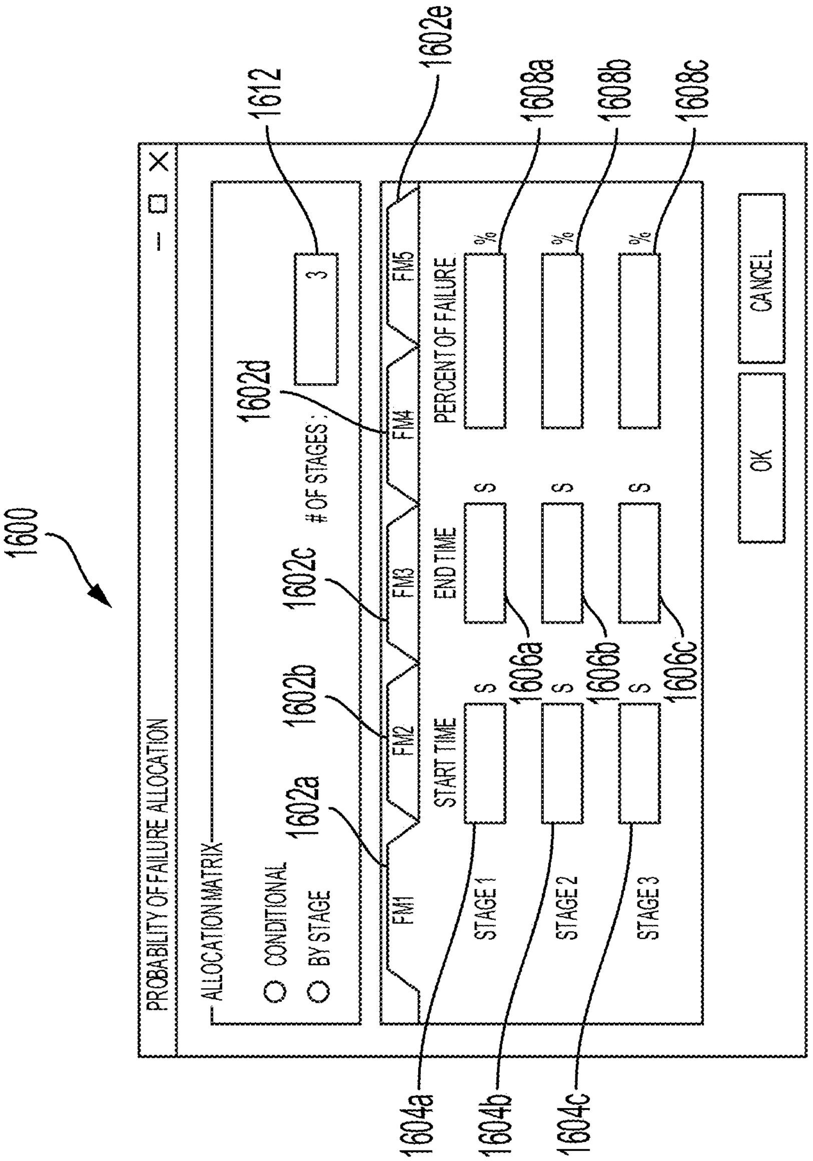
FIG. 16 shows a failure probability interface, according to some embodiments.

FIG. 16 shows a failure probability interface 1600, according to some embodiments. Failure probability interface 1600 may, in some embodiments, be an interface configured to allow a user to define one or more failure modes to be included in a flight risk analysis and/or input probabilities of failure associated with each failure mode during one or more stages of a flight.

Failure probability interface 1600 may include one or more failure mode fields 1602*a*-1602*e*. Each failure mode field may correspond with a vehicle failure mode, such as explosion, structural failure, guidance system malfunction, control system malfunction, and/or other failure. Failure mode fields may be generated dynamically. For example, one or more failure mode fields may be displayed based on an input from a user indicating that the failure mode should be included in a risk assessment. Failure mode fields may be displayed based on other criteria. For example, a predefined set of failure mode fields may be displayed based on a determination that a user has selected a particular vehicle class or vehicle type for analysis. The failure probability interface may display only failure mode fields associated with a particular vehicle class or vehicle type.

In the example of FIG. 16, failure mode fields may be displayed as a series of tabs which, when selected by a user, display information and/or inputs associated with the corresponding failure mode. Alternatively, each failure mode field may be displayed simultaneously, such as in a list.

A failure mode field may include one or more inputs configured to receive information from a user corresponding to the failure mode. A failure mode field may include one or more start time fields 1604*a*-1604*c*, one or more end time fields 1606*a*-1606*c*, and/or one or more failure probability fields 1608*a*-1608*c*. A failure mode field may be configured to receive input from a user corresponding to one or more stages of a flight. In the example of FIG. 16, failure mode field 1602*a* is configured to receive input based on a three-stage flight. For each stage, the failure mode field is configured to receive a start time, end time, and failure probability input corresponding to each stage. In other embodiments, the start time and end time corresponding to a stage of flight may be defined elsewhere, and the failure mode field may be configured to receive only a failure probability input corresponding to each stage of flight.

A failure probability interface may include a stage field 1612. A stage field may be configured to receive an input from a user indicating a number of stages associated with a flight. A failure mode field may be dynamically generated based on the number of stages indicated by a user in a stage field. For example, a failure mode field may display a number of start time, end time, and failure probability fields corresponding to the number of stages of flight.

Figure 17:
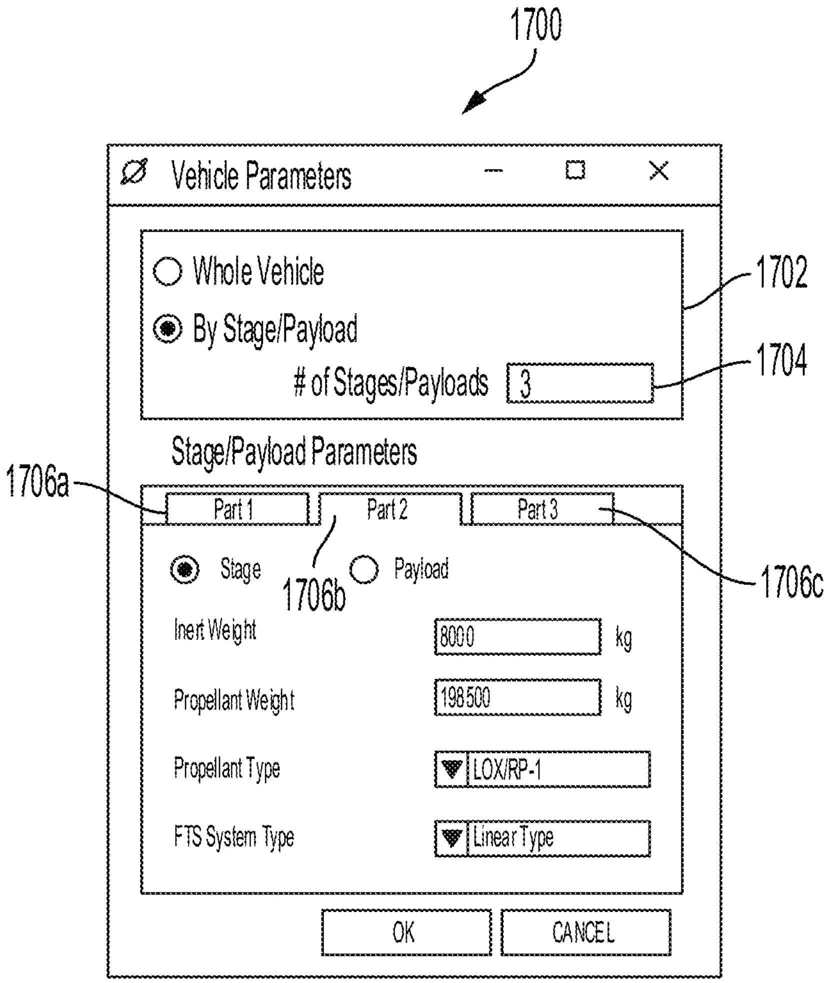
FIG. 17 shows a vehicle specification interface, according to some embodiments.

FIG. 17 shows a vehicle specification interface 1700, according to some embodiments. Vehicle specification interface 1700 may, in some embodiments, be an interface configured to allow a user to define one or more parameters of a vehicle for which flight risk may be assessed.

Vehicle specification interface 1700 may include vehicle field 1702. A vehicle field may include one or more input fields, such as a drop-down menu, check boxes, radio buttons, and/or other input fields, that allow a user to indicate whether a vehicle comprises multiple stages and/or payloads, and/or how many stages and/or payloads a vehicle comprises. If a user indicates that a vehicle comprises multiple stages and/or payloads, the user may enter, such as in field 1704, the number of stages and/or payloads for which vehicle parameters may be provided.

Vehicle specification interface 1700 may include one or more parameter fields 1706*a* through 1706*c*. Each parameter field may correspond to a stage or payload associated with a vehicle.

In the example of FIG. 17, parameter fields may be displayed as a series of tabs which, when selected by a user, display information and/or inputs associated with a stage or payload. Alternatively, each parameter field may be displayed simultaneously, such as in a list.

A parameter field may include one or more inputs, such as drop-down menus, check boxes, radio buttons, and/or other input fields that allow a user to input information associated with a stage or payload. In the example of FIG. 17, parameter field 1706*b* includes input fields allowing a user to indicate whether the parameter field corresponds to a stage or payload, an inert weight of the stage or payload, a propellant weight of the stage or payload, a propellant type of the stage or payload, and an FTS system type of the stage or payload.

Figure 18:
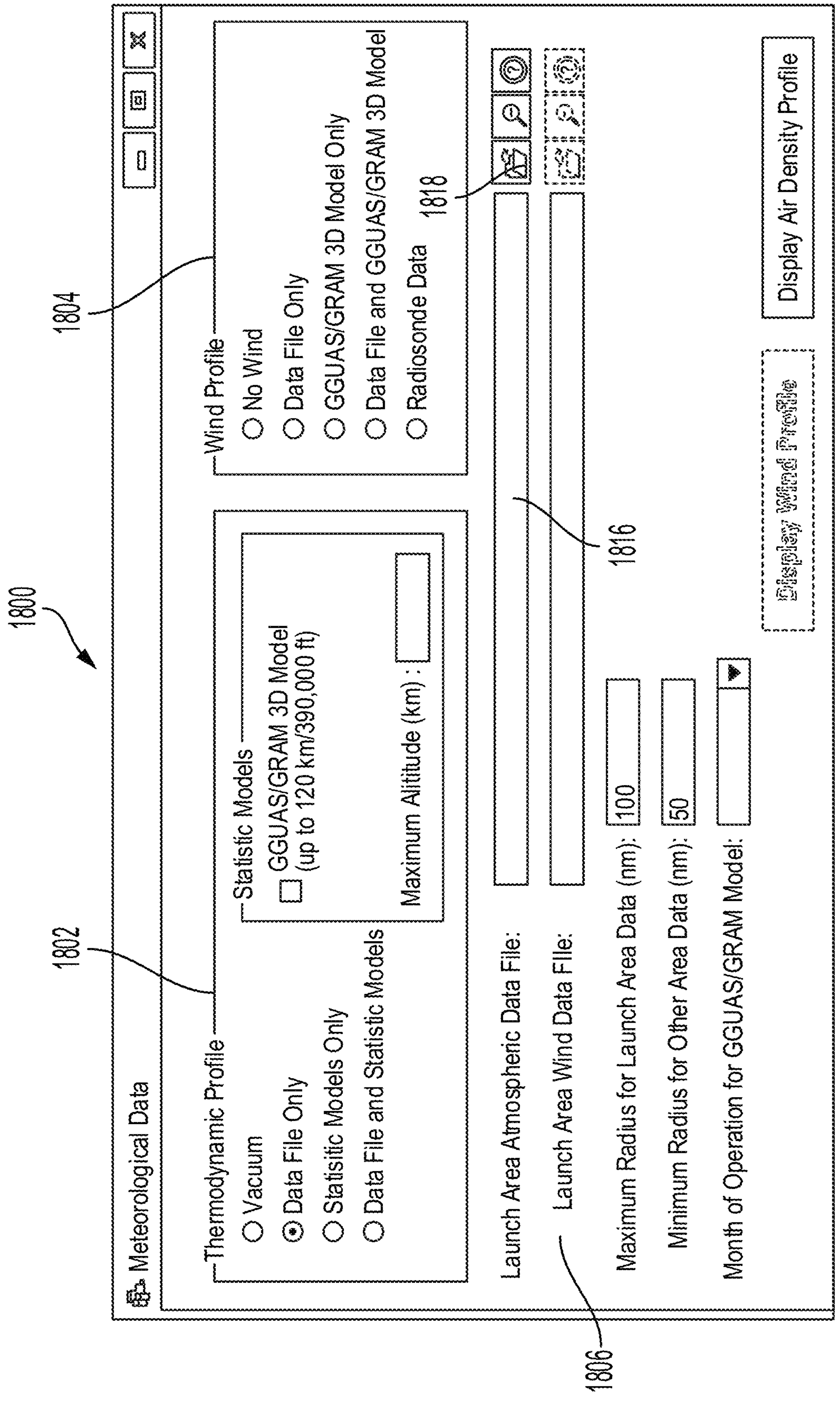
FIG. 18 shows a meteorology interface, according to some embodiments.

FIG. 18 shows a meteorology interface 1800, according to some embodiments. Meteorology interface 1800 may, in some embodiments, be an interface configured to allow a user to select and/or provide wind and/or atmospheric data to be used in a risk assessment.

Meteorology interface 1800 may include a thermodynamic profile field 1802, a wind profile field 1804, and/or a launch area field 1806. Thermodynamic profile field 1802 may comprise one or more inputs, such as drop-down menus, check boxes, radio buttons, and/or other input fields, that allow a user to select a type of atmosphere thermodynamic information to be used during a risk assessment. For example, the thermodynamic profile field may allow a user to select no thermodynamic profile (vacuum), a thermodynamic profile based on a data file, a thermodynamic profile based on statistical models, and/or a thermodynamic profile based on a data file and statistical models.

Thermodynamic profile field 1802, in some embodiments, may include an input 1808 configured to receive input from a user specifying a thermodynamic profile file to be used as a source of atmospheric thermodynamic information in a risk assessment. For example, if a user indicates that a thermodynamic profile should be based on a data file and/or statistical models, input 1808 may be configured to allow a user to identify one or more files comprising thermodynamic data and/or statistical models. Input 1808 may be configured to receive input in the form of text, such as a file name or a file path indicating the location of a thermodynamic profile file in storage. Thermodynamic profile field 1802 may also include a browse icon 1810. A browse icon may be an interactive affordance, in that it may be clicked, tapped, pressed, or otherwise selected to cause the system to display a second user interface enabling a user to navigate to a storage location containing a thermodynamic data or statistical model file and select a thermodynamic profile file, rather than identifying the thermodynamic profile file via input 1808. The meteorology interface may be configured to automatically populate input 1808 based on the user's navigation and file selection in response to selecting browse icon 1810.

Wind profile field 1804 may comprise one or more inputs, such as drop-down menus, check boxes, radio buttons, and/or other input fields, that allow a user to select a type of wind information to be used during a risk assessment. For example, the wind profile field may allow a user to select no wind profile, a wind profile based on a data file, a wind profile based on GGUAS, Radiosonde, or other data, a wind profile based on a data file and other source of data, or other type of wind profile.

Wind profile field 1804, in some embodiments, may include an input 1812 configured to receive input from a user specifying a wind profile file to be used as a source of atmospheric wind in a risk assessment. For example, if a user indicates that a wind profile should be based in whole or in part on a data file, input 1812 may be configured to allow a user to identify one or more files comprising wind data. Input 1812 may be configured to receive input in the form of text, such as a file name or a file path indicating the location of a wind file in storage. Wind profile field 1804 may also include a browse icon 1814. A browse icon may be an interactive affordance, in that it may be clicked, tapped, pressed, or otherwise selected to cause the system to display a second user interface enabling a user to navigate to a storage location containing a wind data file and select a file, rather than identifying the thermodynamic profile file via input 1812. The meteorology interface may be configured to automatically populate input 1812 based on the user's navigation and file selection in response to selecting browse icon 1814.

Launch area field 1806 may comprise one or more inputs, such as drop-down menus, check boxes, radio buttons, and/or other input fields, that allow a user to select atmospheric data corresponding to an area around a launch or reentry area to be used during a risk assessment.

Launch area field 1806, in some embodiments, may include an input 1816 configured to receive input from a user specifying a launch area atmospheric data file to be used as a source of atmospheric information near a launch or reentry site in a risk assessment. Input 1816 may be configured to receive input in the form of text, such as a file name or a file path indicating the location of a launch area atmospheric data file in storage. Launch area field 1806 may also include a browse icon 1818. A browse icon may be an interactive affordance, in that it may be clicked, tapped, pressed, or otherwise selected to cause the system to display a second user interface enabling a user to navigate to a storage location containing a launch area atmospheric data file and select a file, rather than identifying the launch area atmospheric data file via input 1816. The meteorology interface may be configured to automatically populate input 1816 based on the user's navigation and file selection in response to selecting browse icon 1818.

Launch area field 1806 may contain additional inputs that allow a user to configure other parameters associated with launch area atmospheric data and/or thermodynamic profile data. For example, the launch area field may contain inputs that allow a user to configure a maximum radius for launch area data, a minimum radius thermodynamic profile data, or other parameters.

Meteorology interface 1800 may also include one or more inputs allowing a user to configure parameters associated with external data sources and/or statistical models. For example, meteorology interface 1800 may include an input that allows a user to select a month of the year or other time for which data from an external source, such as GGUAS, should be used. Similarly, a user may select a month of the year or other time on which a statistical model should be based.

Figure 19:
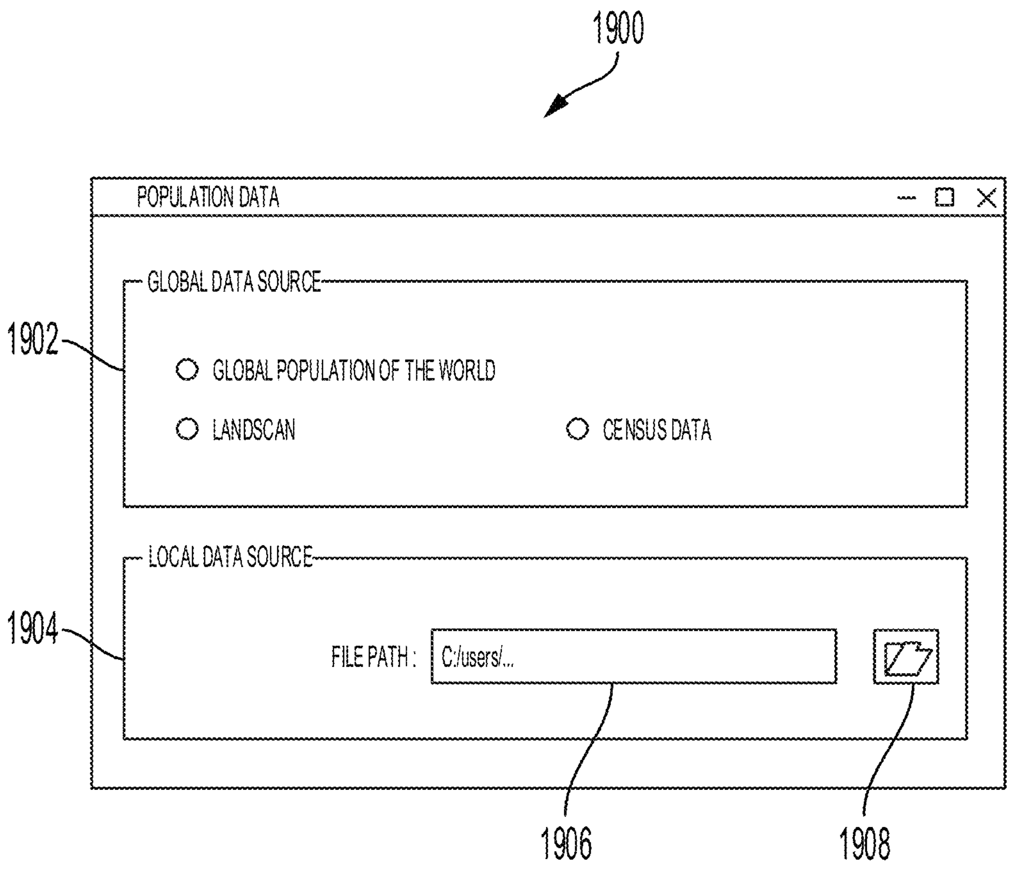
FIG. 19 shows a population interface, according to some embodiments.

FIG. 19 shows a population interface 1900, according to some embodiments. Population interface 1900 may, in some embodiments, be an interface configured to allow a user to select and/or provide population data to be used in a risk assessment, such as general population 250 and/or local population information 240, described with respect to FIG. 2, above.

Population interface 1900 may include a general population field 1902 and a local population field 1904. General population field 1902 may comprise one or more inputs, such as drop-down menus, check boxes, radio buttons, and/or other input fields, that allow a user to select a source of general population information, such as a database that includes population information, to be used during a risk assessment. For example, the general population field may allow a user to select Global Population of the World (GPOS), Landscan, census data, and/or other source of population data.

Local population field 1904, in some embodiments, may include an input 1906 configured to receive input from a user specifying a population file to be used as a source of local population information in a risk assessment. Input 1906 may be configured to receive input in the form of text, such as a file name or a file path indicating the location of a population file in storage. Local population field 1904 may also include a browse icon 1908. A browse icon may be an interactive affordance, in that it may be clicked, tapped, pressed, or otherwise selected to cause the system to display a second user interface enabling a user to navigate to a storage location containing a population file and select a population file, rather than identifying the trajectory file via input 1906. The population interface may be configured to automatically populate input 1906 based on the user's navigation and file selection in response to selecting browse icon 1908.

Figure 20:
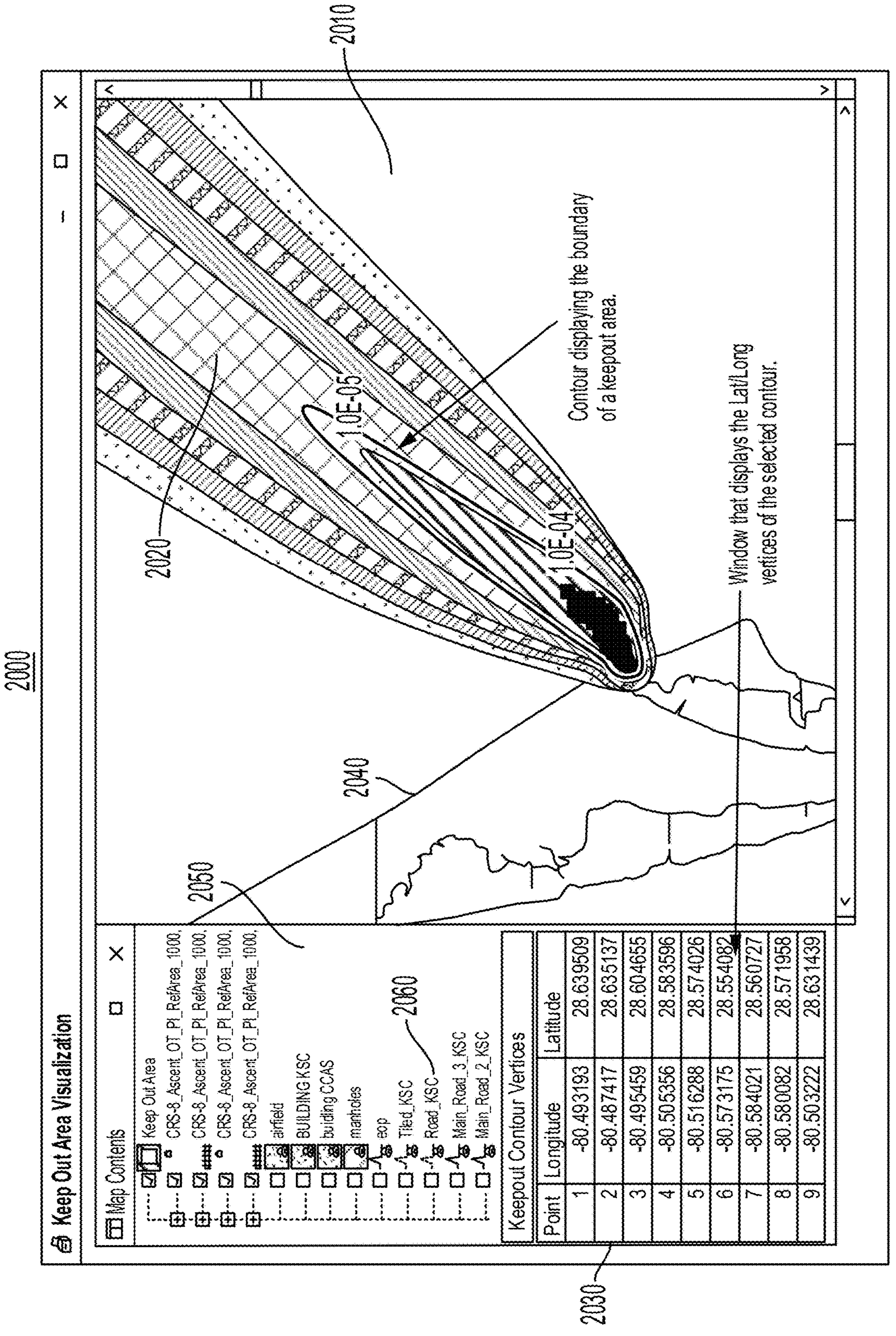
FIG. 20 shows a keep-out area interface, according to some embodiments.

FIG. 20 shows a keep-out area interface 2000, according to some embodiments. A keep-out area interface may include a keep-out map 2010 and one or more keep-out areas 2020. As explained above, a flight risk assessment system may determine coordinates defining keep-out regions. A keep-out area interface may display a visual representation of one or more keep-out areas, such as on a map.

A keep-out area interface may include a coordinate table 2030. A coordinate table may display coordinates that define a boundary of one or more keep-out areas. A coordinate table may be updated based on an input from a user. For example, a keep-out area 2020 may be an interactive affordance, in that it may be clicked, tapped, pressed, hovered over by a cursor, or otherwise selected, to cause the interface to update coordinate table 2030 with coordinates associated with the selected keep-out area.

A keep-out map may include one or more map features 2040, which may indicate a political boundary, such as national, state, or local boundary, or other features, such as buildings, roads, infrastructure, terrain features, or other features.

In some embodiments, features displayed on a keep-out map may be selected based on an input from a user or may be based on a default selection.

A keep-out area interface may include a map feature field 2050. A map feature field may include one or more inputs, such as drop-down menus, check boxes, radio buttons, and/or other input fields, that, when selected or deselected by a user, may cause associated features to be displayed on or hidden from keep-out map 2010. For example, map feature field 2050 may include a road input 2060 that, when selected or deselected by a user, may cause one or more roads to be displayed on or hidden from keep-out map 2010. Similarly, a map feature field may include one or more inputs that, when selected or deselected by a user, cause one or more keep-out areas to be displayed on or hidden from keep-out map 2010. For example, map feature field 2050 may include a boat keep-out area input that, when selected or deselected by a user, may cause a keep-out area corresponding to boats to be displayed on or hidden from keep-out map 2010.

Figure 21:
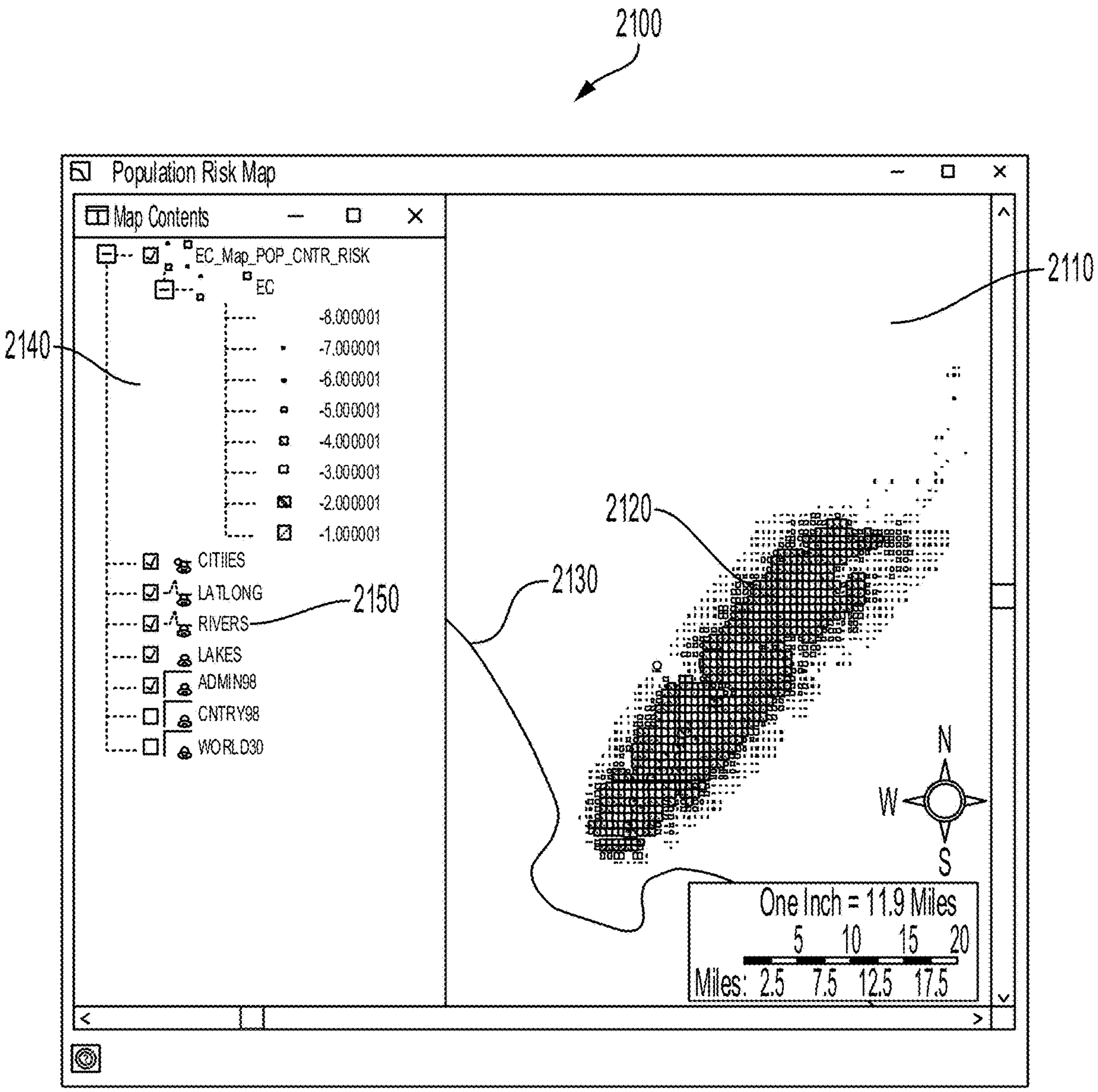
FIG. 21 shows an expected casualty interface, according to some embodiments.

FIG. 21 shows an expected consequence interface 2100, according to some embodiments. An expected consequence interface may include an expected casualty map 2110 and one or more population centers 2120. As explained above, a flight risk assessment system may determine expected consequence values associated with one or more population centers. An expected consequence interface may display a visual representation of expected consequence values associated with one or more population centers, such as on a map. Each population center may be indicated by an icon, such as a circle or square, and a color corresponding to an expected consequence value associated with the population center.

A population center 2120 may be an interactive affordance, in that it may be clicked, tapped, pressed, hovered over by a cursor, or otherwise selected, to cause the interface to update. For example, in response to selection of a population center by a user, expected casualty interface 2100 may display a name of the population center, an expected casualty value of the population center, and/or other information associated with the population center.

An expected consequence map may include one or more map features 2130, which may indicate a political boundary, such as national, state, or local boundary, or other features, such as buildings, roads, infrastructure, terrain features, or other features.

In some embodiments, features displayed on an expected consequence map may be selected based on an input from a user or may be based on a default selection.

An expected consequence interface may include a map feature field 2140. A map feature field may include one or more inputs, such as drop-down menus, check boxes, radio buttons, and/or other input fields, that, when selected or deselected by a user, may cause associated features to be displayed on or hidden from expected consequence map 2110. For example, map feature field 2140 may include a river input 2150 that, when selected or deselected by a user, may cause one or more rivers to be displayed on or hidden from expected consequence map 2110. Similarly, a map feature field may include one or more inputs that, when selected or deselected by a user, cause one or more population centers to be displayed on or hidden from expected consequence map 2110. For example, map feature field 2140 may include one or more inputs associated with one or more expected consequence values or range of expected consequence values that, when selected or deselected by a user, may cause all population centers having an expected consequence value within the set indicated by the input to be displayed on or hidden from expected consequence map 2010.

Figure 22:
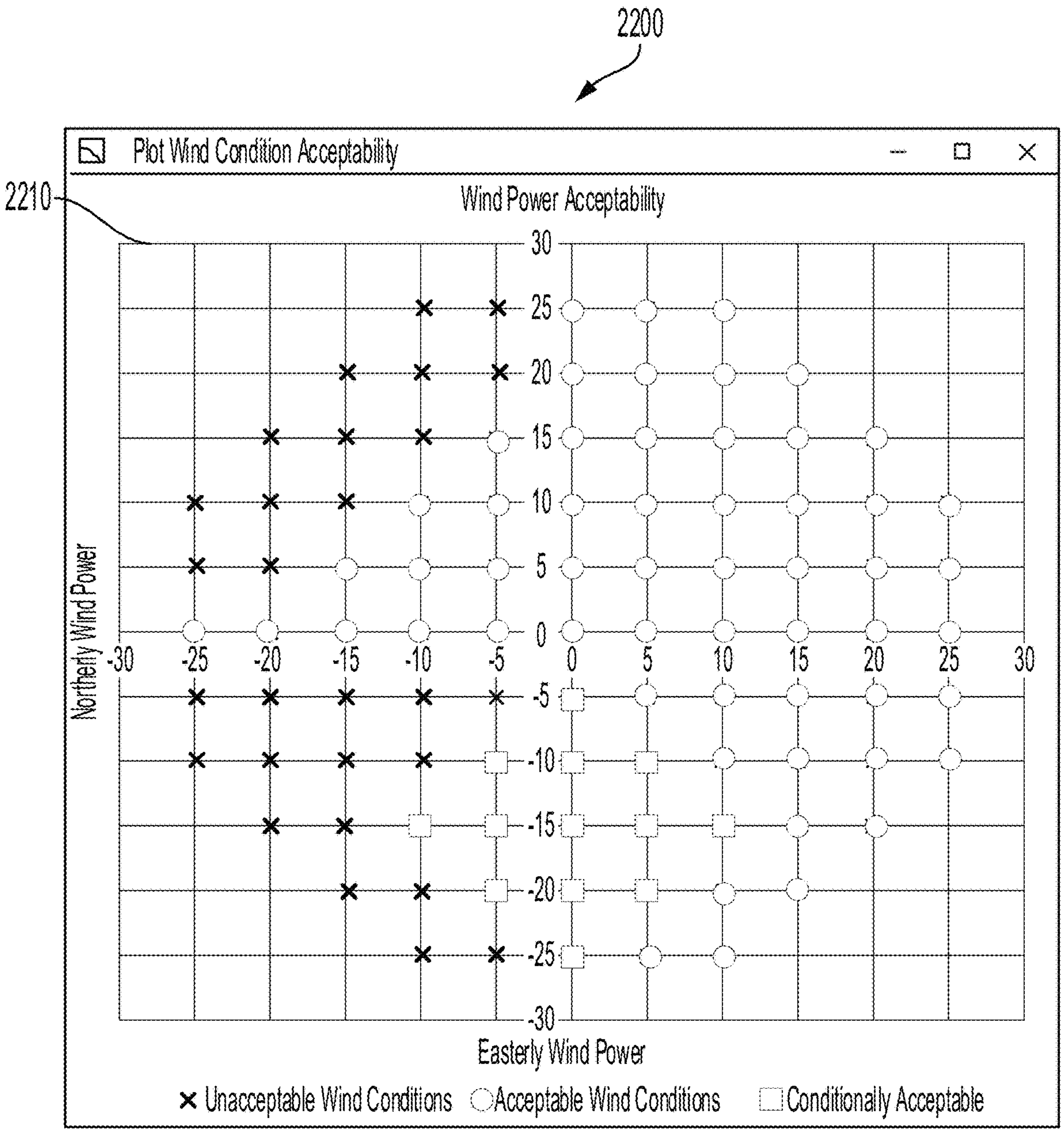
FIG. 22 shows a wind condition interface, according to some embodiments.

FIG. 22 shows a wind condition interface 2200, according to some embodiments. A wind condition interface may include graph 2210. The graph may display data points corresponding to wind directions. Each data point may comprise a color indicating whether an expected consequence value or other metric associated with a flight would be above, equal to, or below a predetermined value if a risk assessment were performed based on the wind speed and direction associated with the corresponding data point. The predetermined value may be based on an input from a user or based on a default value. Additionally, a data point may be marked with a color indicating that a wind speed and direction combination may be conditionally acceptable if the expected value is within a predefined range of the threshold value.

Figure 23:
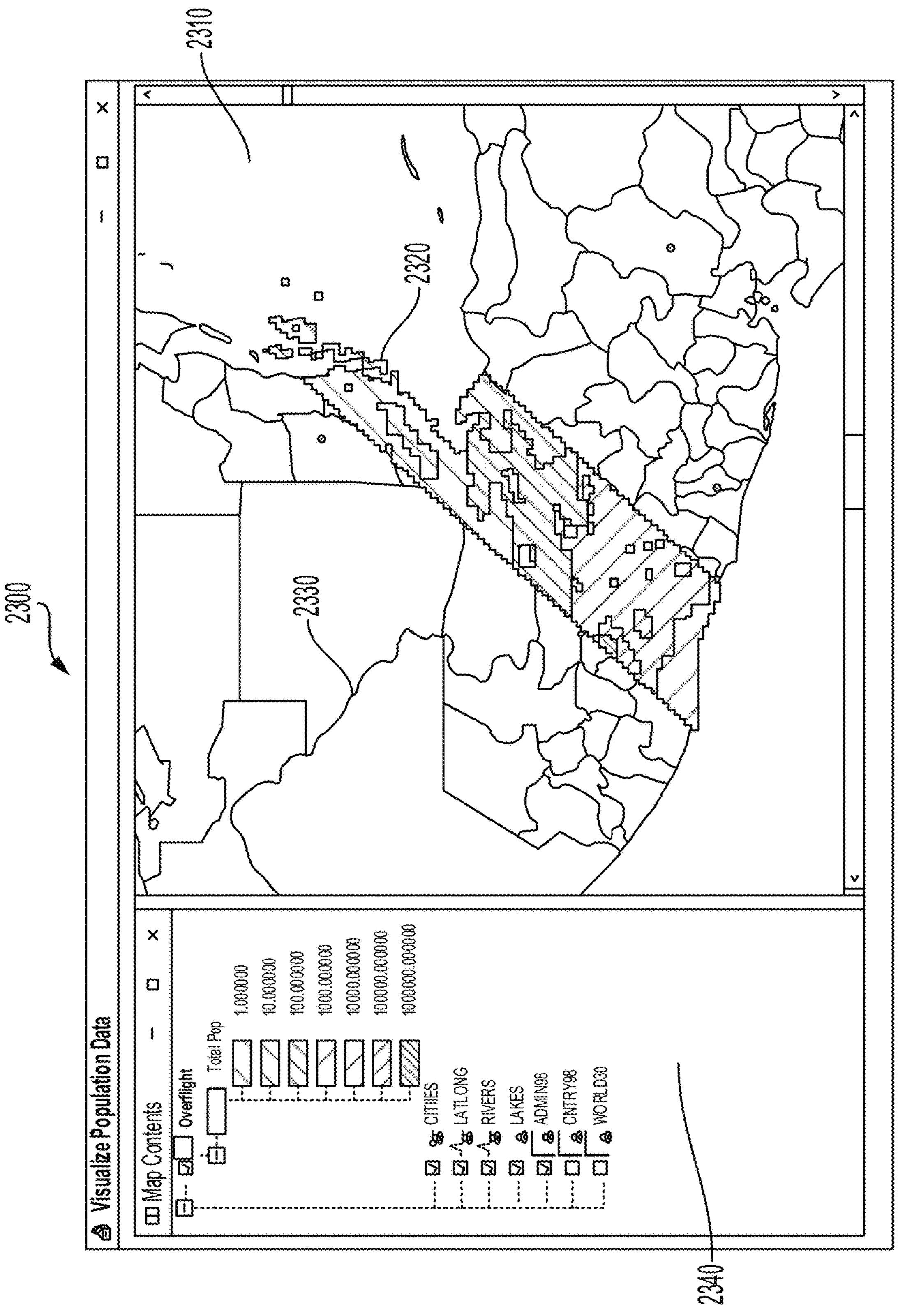
FIG. 23 shows a population visualization interface, according to some embodiments.

FIG. 23 shows a population visualization interface 2300, according to some embodiments. A population interface may include a population map 2310 and one or more population centers 2320. Each population center may be indicated by an icon, such as a circle or square, and a color corresponding to an expected consequence value associated with the population center. The population value may be determined, for example, based on general or local population information 240 and 250, such as described above with respect to FIG. 2.

A population center 2320 may be an interactive affordance, in that it may be clicked, tapped, pressed, hovered over by a cursor, or otherwise selected, to cause the interface to update. For example, in response to selection of a population center by a user, population interface 2100 may display a name of the population center, a population value of the population center, and/or other information associated with the population center.

A population map may include one or more map features 2330, which may indicate a political boundary, such as national, state, or local boundary, or other features, such as buildings, roads, infrastructure, terrain features, or other features.

In some embodiments, features displayed on a population map may be selected based on an input from a user or may be based on a default selection.

A population interface may include a map feature field 2340. A map feature field may include one or more inputs, such as drop-down menus, check boxes, radio buttons, and/or other input fields, that, when selected or deselected by a user, may cause associated features to be displayed on or hidden from population map 2310. For example, map feature field 2340 may include a river input 2350 that, when selected or deselected by a user, may cause one or more roads to be displayed on or hidden from population map 2310. Similarly, a map feature field may include one or more inputs that, when selected or deselected by a user, cause one or more population centers to be displayed on or hidden from population map 2310. For example, map feature field 2340 may include one or more inputs associated with one or more population values or range of population values that, when selected or deselected by a user, may cause all population centers having a population value within the set indicated by the input to be displayed on or hidden from population map 2310.

Figure 24:
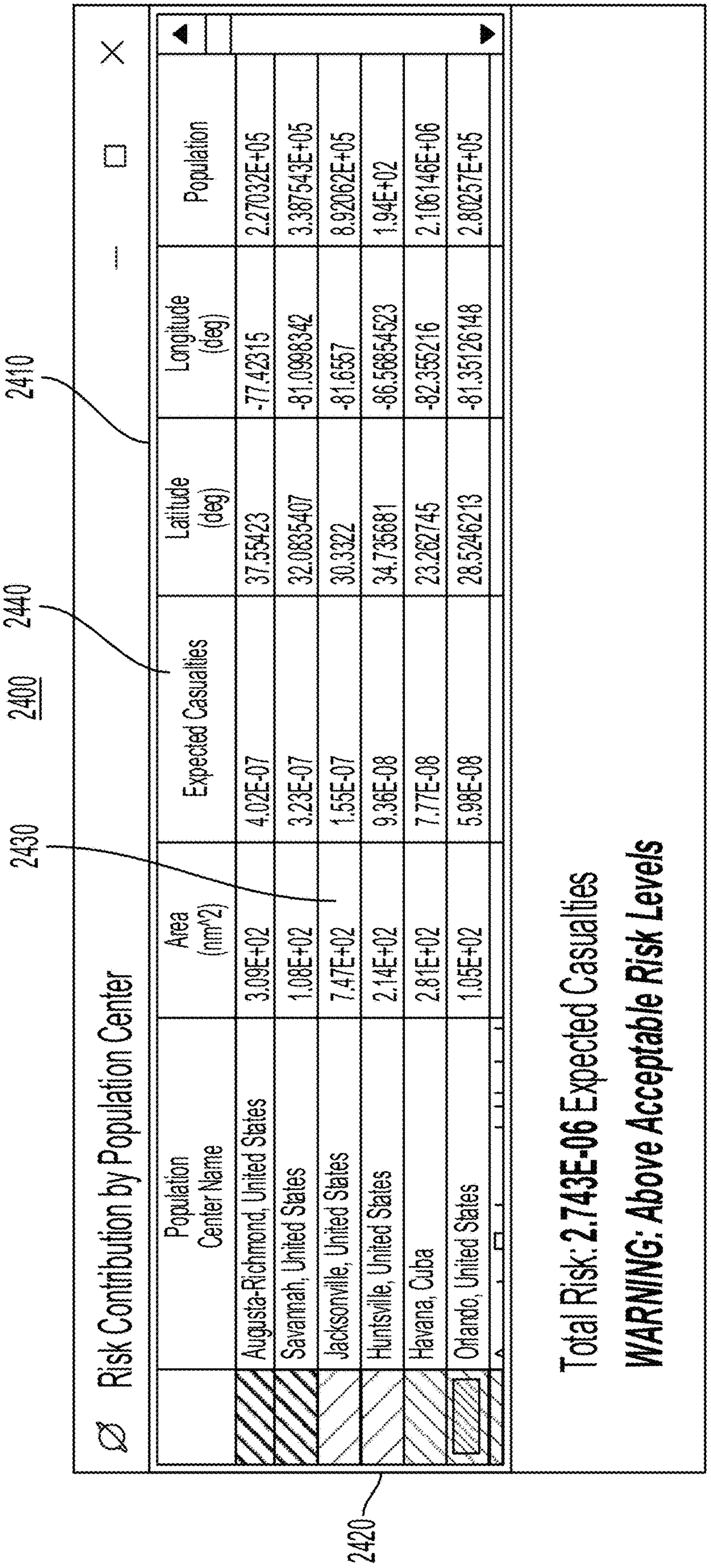
FIG. 24 shows a risk contribution interface, according to some embodiments.

FIG. 24 shows a risk contribution interface 2400, according to some embodiments. A risk contribution interface 2400 may include a table 2410 having one or more rows 2420 and one or more columns 2430. The table may include a heading 2440 associated with each column.

The table may display information associated with one or more population centers. For example, each row may contain information associated with one population center. The table may include the name, area, expected value, latitude, longitude, population, and/or other information associated with a population center. The table may be sorted according to expected consequence value such that population centers with the highest expected consequence value are displayed higher in the table.

Displaying population centers with the highest expected consequence values may enable a user to identify the population centers that contribution the most risk to total flight risk. A user may modify a flight trajectory to avoid high risk population centers, evacuate high risk locations, or take other mitigating action.

The table may be color coded. A color may be displayed for each population center based on the expected consequence value associated with the population center. In some embodiments, a color may be selected for all population centers having a particular expected casualty value or a range of expected casualty values. The expected casualty values and/or ranges associated with colors may be based on an input from a user or may be based on default values.

A heading may be an interactive affordance, in that it may be clicked, tapped, pressed, or otherwise selected to cause the table displayed by the risk contribution interface to be updated. For example, when a heading is selected by a user, the table may be updated to sort the population centers based on the value in the column with which the heading is associated.

The risk contribution interface may also display a total expected consequence value associated with a flight and/or a flight status indicating whether the total expected consequence is above or below a predefined expected consequence value.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. In the foregoing description of the disclosure and embodiments, reference is made to the accompanying drawings, in which are shown, by way of illustration, specific embodiments that can be practiced. It is to be understood that other embodiments and examples can be practiced, and changes can be made without departing from the scope of the present disclosure.

Although the foregoing description uses terms first, second, etc. to describe various elements, these elements should not be limited by the terms. These terms are only used to distinguish one element from another. In addition, it is also to be understood that the singular forms "a," "an," and "the" used in the foregoing description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes," "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The present disclosure also relates to a device for performing the operations herein. This device may be specially constructed for the required purposes, or it may include a general purpose computer selectively activated or reconfigured by a computer program stored in the computer. Such a computer program may be stored in a non-transitory, computer readable storage medium, such as, any type of disk, including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referenced in this disclosure may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the present disclosure as described herein.

The following enumerated embodiments are representative of some aspects disclosed herein. In some embodiments, any one or more features of any one or more of the following enumerated embodiments may be combined (in whole or in part) with any one or more features (in whole or in part) of any one or more of the other enumerated embodiments and/or with any one or more features (in whole or in part) disclosed elsewhere herein, as would be understood by a person of skill in the art in light of the disclosures made herein. In some embodiments, features of different embodiments may be combined with one another (in whole or in part) even where the enumerated interdependencies of the embodiments do not explicitly so indicate.

Embodiment 1. A method for evaluating risk of a launch or reentry, comprising:

- receiving trajectory information associated with a planned flight, wherein the trajectory information comprises a plurality of trajectory vectors;
- receiving information identifying a plurality of consequences of interest,
- receiving information regarding a region of interest for potential hazard areas;
- determining, for each of a plurality of ballistic coefficients, impact probability distributions for each of the plurality of trajectory vectors;
- determining, for each impact probability distribution, respective probabilities of a plurality of adverse consequences;
- determining a set of population centers within the region of interest;
- determining a respective maximum probability of consequence for each of the plurality of consequences of interest,
- determining a respective upper bound of probability of consequence for each population center in the set of population centers; and
- determining a respective upper bound of expected consequence for each population center in the set of population centers based on a number of people in each respective population center subject respectively to each of the consequences of interest;
- determining one or more collective risk metrics for each population center in the set of population centers; and
- determining a collective risk metric for the planned flight for the set of population centers.

Embodiment 2. The method of embodiment 1, wherein each of the plurality of trajectory vectors comprises one or more of: respective time information, respective position information, and respective velocity information.

Embodiment 3. The method of any one of embodiments 1-2, wherein determining impact probability distributions comprises determining the impact probability distributions across one or more ranges selected from: breakup-induced velocity range, a trajectory uncertainty range, a wind effects range, and a lift uncertainty range.

Embodiment 4. The method of any one of embodiments 1-3, wherein determining impact probability distributions comprises determining the impact probability distributions for a set of one or more vehicle failure modes.

Embodiment 5. The method of any one of embodiments 1-4, wherein each impact probability distribution corresponds to a probability of debris landing in one or more locations.

Embodiment 6. The method of any one of embodiments 1-5, wherein determining the respective probabilities comprises using enveloping curves of consequence area as a function of ballistic coefficient.

Embodiment 7. The method of any one of embodiments 1-6, wherein determining population centers is based on one or more external data sources.

Embodiment 8. The method of any one of embodiments 1-7, wherein determining population centers is based on a grid resolution.

Embodiment 9. The method of any one of embodiments 1-8, wherein determining the maximum probability of consequence comprises determining the maximum probability of consequence for each of the failure modes and for each of the population centers.

Embodiment 10. The method of any one of embodiments 1-9, wherein determining the maximum probability of consequence is based on a maximum of the over a set of uncertainties.

Embodiment 11. The method of any one of embodiments 1-10, wherein determining the respective upper bound of probability of consequence for each of the population centers comprises summing probability of consequence over a set of failure modes.

Embodiment 12. The method of embodiment 11, wherein summing probability of consequence comprises weighting each failure mode of the set of failure modes by a respective failure mode probability.

Embodiment 13. The method of any one of embodiments 1-12, wherein determining the respective upper bound of expected consequence for each of the population centers is based on a number of people in the respective population center.

Embodiment 14. The method of embodiment 13, wherein determining the respective upper bound of expected consequence for each of the population centers is based on respective numbers of people in the respective population center subject to a plurality of respective consequences.

Embodiment 15. The method of any one of embodiments 1-14, wherein determining the one or more collective risk metrics for each population center in the set of population centers is based on one or both of:

- the determined respective upper bound of probability of consequence for each population center in the set of population centers; and
- the determined respective upper bound of expected consequence for each population center in the set of population centers based on a number of people in each respective population center subject respectively to each of the consequences of interest.

Embodiment 16. The method of any one of embodiments 1-15, wherein determining the collective risk metric for the planned flight for the set of population centers is based on the determined one or more collective risk metrics for each population center in the set of population centers.

Embodiment 17. The method of any one of embodiments 1-16, further comprising, in accordance with a determination that the collective risk metric for the planned flight for the set of population centers is less than a threshold risk level, approving the flight.

Embodiment 18. The method of any one of embodiments 17, wherein approving the flight comprises generating and displaying an indication that the flight is approved.

Embodiment 19. The method of any one of embodiments 1-18, further comprising, in accordance with a determination that the collective risk metric for the planned flight for the set of population centers is greater than or equal to a threshold risk level, canceling the flight.

Embodiment 20. The method of embodiment 19, wherein canceling the flight comprises generating and displaying an indication that the flight is canceled.

Embodiment 21. The method of any one of embodiments 19-20, wherein canceling the flight comprises automatically disabling one or more systems associated with the planned flight.

Embodiment 22. The method of any one of embodiments 1-21, further comprising displaying to a user an indication of the collective risk metric for the planned flight for the set of population centers.

Embodiment 23. The method of any one of embodiments 1-22, wherein at least one of the one or more vehicle failure modes is selected from the group comprising on-trajectory structural failure, on-trajectory explosion, guidance system failure, control system failure, and loss of thrust.

Embodiment 24. An electronic system, comprising:

one or more processors;

one or more memories; and one or more programs, wherein the one or more programs are stored in the one or more memories and configured to be executed by the one or more processors, the one or more programs including instructions for:

receiving trajectory information associated with a planned flight, wherein the trajectory information comprises a plurality of trajectory vectors;

receiving information identifying a plurality of consequences of interest, receiving information regarding a region of interest for potential hazard areas;

determining, for each of a plurality of ballistic coefficients, impact probability distributions for each of the plurality of trajectory vectors;

determining, for each impact probability distribution, respective probabilities of a plurality of adverse consequences;

determining a set of population centers within the region of interest;

determining a respective maximum probability of consequence for each of the plurality of consequences of interest, determining a respective upper bound of probability of consequence for each population center in the set of population centers; and determining a respective upper bound of expected consequence for each population center in the set of population centers based on a number of people in each respective population center subject respectively to each of the consequences of interest;

determining one or more collective risk metrics for each population center in the set of population centers; and determining a collective risk metric for the planned flight for the set of population centers.

Embodiment 25. A non-transitory computer readable storage medium storing instructions that, when executed by one or more processors of a system, cause the system to:

receive trajectory information associated with a planned flight, wherein the trajectory information comprises a plurality of trajectory vectors;

receive information identifying a plurality of consequences of interest, receive information regarding a region of interest for potential hazard areas;

determine, for each of a plurality of ballistic coefficients, impact probability distributions for each of the plurality of trajectory vectors;

determine, for each impact probability distribution, respective probabilities of a plurality of adverse consequences;

determine a set of population centers within the region of interest;

determine a respective maximum probability of consequence for each of the plurality of consequences of interest, determine a respective upper bound of probability of consequence for each population center in the set of population centers; and determine a respective upper bound of expected consequence for each population center in the set of population centers based on a number of people in each respective population center subject respectively to each of the consequences of interest;

determine one or more collective risk metrics for each population center in the set of population centers; and determine a collective risk metric for the planned flight for the set of population centers.

Embodiment 26. A method for evaluating risk of a launch or reentry, comprising:

receiving trajectory information associated with a planned flight, wherein the trajectory information comprises a series of trajectory vectors, each trajectory vector comprising time information, position information and velocity information;

receiving identification of consequences of interest, and extent of a region of interest for potential hazard areas;

determining, for each of a plurality of ballistic coefficients, impact probability distributions for each trajectory vector, across a credible range of breakup-induced velocity, trajectory uncertainty, wind effects, and lift uncertainty for a set of one or more vehicle failure modes, wherein each impact probability distribution corresponds to the probability of debris landing in one or more locations;

determining, for each impact probability distribution, the probabilities of consequence for different adverse consequences, using enveloping curves of consequence area as a function of ballistic coefficient;

determining populations, based on external data sources, and a grid resolution, within the region of interest;

determining a maximum probability of consequence for each identified consequence of interest, for each failure mode, and for each population center and grid cell, based on a maximum of the probability over uncertainties, determining an upper bound of a probability of consequence for each grid cell and population center by summing the probability of consequence over all failure modes, weighted by the probability of the failure mode; and determining an upper bound of expected consequence for each population center based on a number of people in each population center subject to different consequences, determining one or more collective risk metrics for each population center, and a collective risk metric for all population centers.

Embodiment 27. The method of embodiment 26, further comprising:

in accordance with a determination that the collective risk metric for all population centers is less than a predefined level, approving the flight.

Embodiment 28. The method of any one of embodiments 26-27, further comprising:

in accordance with a determination that the collective risk metric for all population centers is greater than a predefined level, canceling the flight.

Embodiment 29. The method of any one of embodiments 26-28, further comprising displaying to a user the collective risk metric for all population centers.

Embodiment 30. The method of any one of embodiments 26-29, wherein at least one of the one or more vehicle failure modes is selected from the group comprising on-trajectory structural failure, on-trajectory explosion, guidance system failure, control system failure, or loss of thrust.

Embodiment 31. An electronic system, comprising:

one or more processors;

one or more memories; and one or more programs, wherein the one or more programs are stored in the one or more memories and configured to be executed by the one or more processors, the one or more programs including instructions for:

receiving trajectory information associated with a planned flight, wherein the trajectory information comprises a series of trajectory vectors, each trajectory vector comprising time information, position information and velocity information;

receiving identification of consequences of interest, and extent of a region of interest for potential hazard areas;

determining, for each of a plurality of ballistic coefficients, impact probability distributions for each trajectory vector, across a credible range of breakup-induced velocity, trajectory uncertainty, wind effects, and lift uncertainty for a set of one or more vehicle failure modes, wherein each impact probability distribution corresponds to the probability of debris landing in one or more locations;

determining, for each impact probability distribution, the probabilities of consequence for different adverse consequences, using enveloping curves of consequence area as a function of ballistic coefficient;

determining populations, based on external data sources, and a grid resolution, within the region of interest;

determining a maximum probability of consequence for each identified consequence of interest, for each failure mode, and for each population center and grid cell, based on a maximum of the probability over uncertainties, determining an upper bound of a probability of consequence for each grid cell and population center by summing the probability of consequence over all failure modes, weighted by the probability of the failure mode; and determining an upper bound of expected consequence for each population center based on a number of people in each population center subject to different consequences, determining one or more collective risk metrics for each population center, and a collective risk metric for all population centers.

Embodiment 32. A non-transitory computer readable storage medium storing one or more programs, the one or more programs comprising instructions, which when executed by an electronic system, cause the device to:

receive trajectory information associated with a planned flight, wherein the trajectory information comprises a series of trajectory vectors, each trajectory vector comprising time information, position information and velocity information;

receive identification of consequences of interest, and extent of a region of interest for potential hazard areas;

determine, for each of a plurality of ballistic coefficients, impact probability distributions for each trajectory vector, across a credible range of breakup-induced velocity, trajectory uncertainty, wind effects, and lift uncertainty for a set of one or more vehicle failure modes, wherein each impact probability distribution corresponds to the probability of debris landing in one or more locations;

determine, for each impact probability distribution, the probabilities of consequence for different adverse consequences, using enveloping curves of consequence area as a function of ballistic coefficient;

determine populations, based on external data sources, and a grid resolution, within the region of interest;

determine a maximum probability of consequence for each identified consequence of interest, for each failure mode, and for each population center and grid cell, based on a maximum of the probability over uncertainties, determine an upper bound of a probability of consequence for each grid cell and population center by summing the probability of consequence over all failure modes, weighted by the probability of the failure mode; and determine an upper bound of expected consequence for each population center based on a number of people in each population center subject to different consequences, determining one or more collective risk metrics for each population center, and a collective risk metric for all population centers.

The invention claimed is:

1. A method for evaluating risk of a launch or reentry, comprising:

receiving trajectory information associated with a planned flight, wherein the trajectory information comprises a plurality of trajectory vectors;

receiving information identifying a plurality of consequences of interest, receiving information regarding a region of interest for potential hazard areas;

determining, for each of a plurality of ballistic coefficients, impact probability distributions for each of the plurality of trajectory vectors;

determining, for each impact probability distribution, respective probabilities of a plurality of adverse consequences;

determining a set of population centers within the region of interest;

determining a respective maximum probability of consequence for each of the plurality of consequences of interest, determining a respective upper bound of probability of consequence for each population center in the set of population centers; and determining a respective upper bound of expected consequence for each population center in the set of population centers based on a number of people in each respective population center subject respectively to each of the consequences of interest;

determining one or more collective risk metrics for each population center in the set of population centers;

determining a collective risk metric for the planned flight for the set of population centers;

and in accordance with a determination that the collective risk metric for the planned flight for the set of population centers is greater than or equal to a threshold risk level, canceling the flight, wherein canceling the flight comprises automatically disabling one or more systems associated with the planned flight.

2. The method of claim 1, wherein each of the plurality of trajectory vectors comprises one or more of: respective time information, respective position information, and respective velocity information.

3. The method of claim 1, wherein determining impact probability distributions comprises determining the impact probability distributions across one or more ranges selected from: breakup-induced velocity range, a trajectory uncertainty range, a wind effects range, and a lift uncertainty range.

4. The method of claim 1, wherein determining impact probability distributions comprises determining the impact probability distributions for a set of one or more vehicle failure modes.

5. The method of claim 1, wherein each impact probability distribution corresponds to a probability of debris landing in one or more locations.

6. The method of claim 1, wherein determining the respective probabilities comprises using enveloping curves of consequence area as a function of ballistic coefficient.

7. The method of claim 1, wherein determining population centers is based on one or more external data sources.

8. The method of claim 1, wherein determining population centers is based on a grid resolution.

9. The method of claim 1, wherein determining the maximum probability of consequence comprises determining the maximum probability of consequence for each of the failure modes and for each of the population centers.

10. The method of claim 1, wherein determining the maximum probability of consequence is based on a maximum of the over a set of uncertainties.

11. The method of claim 1, wherein determining the respective upper bound of probability of consequence for each of the population centers comprises summing probability of consequence over a set of failure modes.

12. The method of claim 11, wherein summing probability of consequence comprises weighting each failure mode of the set of failure modes by a respective failure mode probability.

13. The method of claim 1, wherein determining the respective upper bound of expected consequence for each of the population centers is based on a number of people in the respective population center.

14. The method of claim 13, wherein determining the respective upper bound of expected consequence for each of the population centers is based on respective numbers of people in the respective population center subject to a plurality of respective consequences.

15. The method of claim 1, wherein determining the one or more collective risk metrics for each population center in the set of population centers is based on one or both of:

the determined respective upper bound of probability of consequence for each population center in the set of population centers; and the determined respective upper bound of expected consequence for each population center in the set of population centers based on a number of people in each respective population center subject respectively to each of the consequences of interest.

16. The method of claim 1, wherein determining the collective risk metric for the planned flight for the set of population centers is based on the determined one or more collective risk metrics for each population center in the set of population centers.

17. The method of claim 1, further comprising, in accordance with a determination that the collective risk metric for the planned flight for the set of population centers is less than a threshold risk level, approving the flight.

18. The method of claim 17, wherein approving the flight comprises generating and displaying an indication that the flight is approved.

19. The method of claim 1, wherein canceling the flight comprises generating and displaying an indication that the flight is canceled.

20. The method of claim 1, further comprising displaying to a user an indication of the collective risk metric for the planned flight for the set of population centers.

21. The method of claim 1, wherein at least one of the one or more vehicle failure modes is selected from the group comprising on-trajectory structural failure, on-trajectory explosion, guidance system failure, control system failure, and loss of thrust.

22. An electronic system, comprising:

one or more processors;

one or more memories; and one or more programs, wherein the one or more programs are stored in the one or more memories and configured to be executed by the one or more processors, the one or more programs including instructions for:

receiving trajectory information associated with a planned flight, wherein the trajectory information comprises a plurality of trajectory vectors;

receiving information identifying a plurality of consequences of interest, receiving information regarding a region of interest for potential hazard areas;

determining, for each of a plurality of ballistic coefficients, impact probability distributions for each of the plurality of trajectory vectors;

determining, for each impact probability distribution, respective probabilities of a plurality of adverse consequences;

determining a set of population centers within the region of interest;

determining a respective maximum probability of consequence for each of the plurality of consequences of interest, determining a respective upper bound of probability of consequence for each population center in the set of population centers; and determining a respective upper bound of expected consequence for each population center in the set of population centers based on a number of people in each respective population center subject respectively to each of the consequences of interest;

determining one or more collective risk metrics for each population center in the set of population centers;

determining a collective risk metric for the planned flight for the set of population centers;

and in accordance with a determination that the collective risk metric for the planned flight for the set of population centers is greater than or equal to a threshold risk level, canceling the flight, wherein canceling the flight comprises automatically disabling one or more systems associated with the planned flight.

23. A non-transitory computer readable storage medium storing instructions that, when executed by one or more processors of a system, cause the system to:

receive trajectory information associated with a planned flight, wherein the trajectory information comprises a plurality of trajectory vectors;

receive information identifying a plurality of consequences of interest, receive information regarding a region of interest for potential hazard areas;

determine, for each of a plurality of ballistic coefficients, impact probability distributions for each of the plurality of trajectory vectors;

determine, for each impact probability distribution, respective probabilities of a plurality of adverse consequences;

determine a set of population centers within the region of interest;

determine a respective maximum probability of consequence for each of the plurality of consequences of interest, determine a respective upper bound of probability of consequence for each population center in the set of population centers; and determine a respective upper bound of expected consequence for each population center in the set of population centers based on a number of people in each respective population center subject respectively to each of the consequences of interest;

determine one or more collective risk metrics for each population center in the set of population centers;

determine a collective risk metric for the planned flight for the set of population centers;

and in accordance with a determination that the collective risk metric for the planned flight for the set of population centers is greater than or equal to a threshold risk level, cancel the flight, wherein canceling the flight comprises automatically disabling one or more systems associated with the planned flight.

* * * * *